United States Patent
Akkarakaran et al.

(10) Patent No.: US 10,798,704 B2
(45) Date of Patent: Oct. 6, 2020

(54) REFERENCE SIGNAL DESIGN FOR SLOT AGGREGATION

(71) Applicant: QUALCOMM Incorporated, San Diego, CA (US)

(72) Inventors: Sony Akkarakaran, Poway, CA (US); Tao Luo, San Diego, CA (US); Xiao Feng Wang, San Diego, CA (US); Makesh Pravin John Wilson, San Diego, CA (US); Sumeeth Nagaraja, San Diego, CA (US); Kaushik Chakraborty, San Diego, CA (US); Wooseok Nam, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/964,010

(22) Filed: Apr. 26, 2018

(65) Prior Publication Data

US 2018/0317225 A1  Nov. 1, 2018

Related U.S. Application Data

(60) Provisional application No. 62/492,040, filed on Apr. 28, 2017.

(51) Int. Cl.
*H04W 52/24* (2009.01)
*H04W 72/04* (2009.01)
(Continued)

(52) U.S. Cl.
CPC ....... *H04W 72/0446* (2013.01); *H04L 5/0044* (2013.01); *H04L 5/0048* (2013.01);
(Continued)

(58) Field of Classification Search
CPC ... H04L 5/0048; H04L 5/0035; H04L 5/0051; H04L 5/0053; H04L 5/0055; H04L 1/1861; H04L 1/1671
See application file for complete search history.

(56) References Cited

U.S. PATENT DOCUMENTS

| | | | |
|---|---|---|---|
| 2010/0118836 A1* | 5/2010 | Kazmi | H04L 27/2618 370/336 |
| 2012/0320847 A1* | 12/2012 | Nam | H04L 1/1893 370/329 |

(Continued)

FOREIGN PATENT DOCUMENTS

EP        2740248 B1 *  8/2012  ............... H04L 5/00

OTHER PUBLICATIONS

ZTE Corporation et al., "Reference Signal Design for NR MIMO", 3GPP Draft; R1-166213 Reference Signal Design for NR MIMO Final, 3rd Generation Partnership Project (3GPP), Gothenburg, Sweden, Aug. 22-26, 2016 (6 pages).

(Continued)

*Primary Examiner* — Sai Aung
(74) *Attorney, Agent, or Firm* — Linda G. Gunderson; Holland & Hart LLP

(57) ABSTRACT

Methods, systems, and devices for wireless communication are described. The described techniques provide for configuration and transmission of reference signals over aggregated mini-slots by modifying (e.g., extending) transmission time intervals (TTIs) or sharing reference signals across multiple mini-slots. The reference signals may be shared between multiple aggregated mini-slots and a reference signal pattern may be determined based on data payload allocation, modulation coding scheme (MCS), rank, or other factors of the aggregated mini-slots. Data payloads may be (Continued)

scheduled jointly or separately for each mini-slot and may be allocated across a set of aggregated mini-slots.

30 Claims, 15 Drawing Sheets

(51) Int. Cl.
*H04W 4/00* (2018.01)
*H04L 5/00* (2006.01)
*H04W 72/12* (2009.01)

(52) U.S. Cl.
CPC ......... *H04W 72/042* (2013.01); *H04L 5/0053* (2013.01); *H04W 72/1268* (2013.01)

(56) References Cited

U.S. PATENT DOCUMENTS

| | | | |
|---|---|---|---|
| 2014/0241150 A1* | 8/2014 | Ng | H04W 56/00 370/229 |
| 2015/0092694 A1* | 4/2015 | You | H04W 4/70 370/329 |
| 2015/0117291 A1* | 4/2015 | Seo | H04L 5/001 370/312 |
| 2017/0101968 A1 | 7/2017 | Nam et al. | |
| 2017/0201968 A1 | 7/2017 | Nam et al. | |
| 2017/0222768 A1 | 8/2017 | Lee et al. | |
| 2018/0092086 A1* | 3/2018 | Nammi | H04L 27/264 |
| 2018/0206267 A1* | 7/2018 | Islam | H04W 72/1289 |
| 2019/0075582 A1* | 3/2019 | Kim | H04L 27/2613 |

OTHER PUBLICATIONS

QUALCOMM Europe, "Flexible Data and Reference Multiplexing for LTE-Advanced Uplink", R1-091472, 3GPP TSG-RAN WG1 #56 bis, Seoul, Korea, Mar. 23-27, 2009 (7 pages).

Huawei, "Discussion on Reference Signal Design", R1-167204, 3GPP TSG RAN WG1 Meeting #86, Gothenburg, Sweden, Aug. 22-26, 2016 (3 pages).

Huawei et al., "Overview on Mini-Slot Design," 3GPP Draft; R1-1704219, 3rd Generation Partnership Project (3GPP), Mobile Competence Centre; 650, Route Des Lucioles; F-06921 Sophia-Antipolis Cedex; France, vol. RAN WG1, No. Spokane, USA; 20170403-20170407, Apr. 2, 2017, XP051242371, 8 pages, Retrieved from the Internet: URL: http://www.3gpp.org/ftp/Meetings_3GPP_SYNC/RAN1/Docs/ [retrieved on Apr. 2, 2017].

Huawei et al., "UL Grant-Free Transmission," 3GPP Draft; R1-1701665, 3rd Generation Partnership Project (3GPP), Mobile Competence Centre; 650, Route Des Lucioles; F-06921 Sophia-Antipolis Cedex; France, vol. Ran wg1, No. Athens, Greece; 20170213 20170217, Feb. 12, 2017, XP051208832, 15 pages, Retrieved from the Internet: URL: http://www.3gpp.org/ftp/Meetings_3GPP_SYNC/RAN1/Docs/ [retrieved on Feb. 12, 2017].

International Search Report and Written Opinion—PCT/US2018/029935—ISA/EPO—dated Jul. 19, 2018 (174071WO).

NTT DOCOMO, et al., "Summary of [87-36]: Mini-slot designs for NR", 3GPP Draft; R1-1700617, 3rd Generation Partnership Project (3GPP), Mobile Competence Centre; 650, Route Des Lucioles; F-06921 Sophia-Antipolis Cedex; France, vol. RAN WG1, No. Spokane, USA; 20170116-20170120, Jan. 17, 2017 (Jan. 17, 2017), XP051222222, Retrieved from the Internet: URL: http://www.3gpp.org/ftp/tsg_ran/WG1_RL1/TSGR1_AH/NR_AH_1701/Docs/ [retrieved on Jan. 17, 2017].

* cited by examiner

REFERENCE SIGNAL DESIGN FOR SLOT AGGREGATION

CROSS REFERENCES

The present Application for Patent claims priority to U.S. Provisional Patent Application No. 62/492,040 by Akkarakaran, et al., entitled "Reference Signal Design For Slot Aggregation," filed Apr. 28, 2017, assigned to the assignee hereof and expressly incorporated by reference in its entirety.

BACKGROUND

The following relates generally to wireless communication, and more specifically to reference signal design for slot aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may implement slot aggregation in which multiple slots or mini-slots may be aggregated together for communication between a UE and a base station. When transmitting reference signals, a UE may be configured to transmit a given reference signal sequence at different times or at different frequencies, which can be used to provide feedback, estimate channel conditions, etc. If slot aggregation is employed, traditional reference signal structures may not be suitable for use over the aggregated slots and therefore, a reference signal configuration for slot aggregation is desired.

SUMMARY

The described techniques relate to improved methods, systems, devices, or apparatuses that support reference signal design for slot aggregation. Generally, the described techniques provide for transmission of reference signals over one or more slots or mini-slots by modifying (e.g., extending) transmission time intervals (TTIs) or sharing reference signal configurations across multiple mini-slots. The multiple mini-slots may be scheduled jointly (e.g., using a single grant) or separately (e.g., using multiple respective grants for each mini-slot).

Reference signal configurations may be shared between multiple aggregated mini-slots and a reference signal pattern may be determined based on data payload allocation, modulation coding scheme (MCS), rank, or other factors of the aggregated mini-slots. Data payloads may be scheduled jointly or separately for each mini-slot and in some cases, may be allocated across a set of aggregated mini-slots. In case of a single payload scheduled across all aggregated mini-slots, a fractional transport block size (TBS) for each mini-slot may be determined based on a number of resource elements (REs) allocated to the set of aggregated mini-slots, among other factors. Such techniques may be used for the configuration and transmission of one or more reference signals or data payloads in systems deploying slot or mini-slot aggregation.

A method of wireless communication is described. The method may include identifying a set of aggregated mini-slots to be used for transmission of one or more reference signals and at least one data payload, determining a reference signal configuration for transmission of the one or more reference signals via the set of aggregated mini-slots, allocating the at least one data payload to resources associated with the set of aggregated mini-slots, and transmitting, via the set of aggregated mini-slots, the one or more reference signals and the at least one data payload based at least in part on the reference signal configuration and the allocation of the at least one data payload.

An apparatus for wireless communication is described. The apparatus may include means for identifying a set of aggregated mini-slots to be used for transmission of one or more reference signals and at least one data payload, means for determining a reference signal configuration for transmission of the one or more reference signals via the set of aggregated mini-slots, means for allocating the at least one data payload to resources associated with the set of aggregated mini-slots, and means for transmitting, via the set of aggregated mini-slots, the one or more reference signals and the at least one data payload based at least in part on the reference signal configuration and the allocation of the at least one data payload.

Another apparatus for wireless communication is described. The apparatus may include a processor, memory in electronic communication with the processor, and instructions stored in the memory. The instructions may be operable to cause the processor to identify a set of aggregated mini-slots to be used for transmission of one or more reference signals and at least one data payload, determine a reference signal configuration for transmission of the one or more reference signals via the set of aggregated mini-slots, allocate the at least one data payload to resources associated with the set of aggregated mini-slots, and transmit, via the set of aggregated mini-slots, the one or more reference signals and the at least one data payload based at least in part on the reference signal configuration and the allocation of the at least one data payload.

A non-transitory computer readable medium for wireless communication is described. The non-transitory computer-readable medium may include instructions operable to cause a processor to identify a set of aggregated mini-slots to be used for transmission of one or more reference signals and at least one data payload, determine a reference signal configuration for transmission of the one or more reference signals via the set of aggregated mini-slots, allocate the at least one data payload to resources associated with the set of aggregated mini-slots, and transmit, via the set of aggregated mini-slots, the one or more reference signals and the at least one data payload based at least in part on the reference signal configuration and the allocation of the at least one data payload.

In some examples of the method, apparatus, and non-transitory computer-readable medium described above, allocating the at least one data payload comprises: allocating the at least one data payload across the set of aggregated mini-slots.

In some examples of the method, apparatus, and non-transitory computer-readable medium described above, allocating the at least one data payload comprises: allocating each data payload of the at least one data payload to respective mini-slots of the set of aggregated mini-slots.

In some examples of the method, apparatus, and non-transitory computer-readable medium described above, determining the reference signal configuration comprises: determining a reference signal pattern for each mini-slot of the set of aggregated mini-slots.

In some examples of the method, apparatus, and non-transitory computer-readable medium described above, determining the reference signal configuration comprises: determining a reference signal pattern across the set of aggregated mini-slots.

In some examples of the method, apparatus, and non-transitory computer-readable medium described above, the determination of the reference signal pattern for each mini-slot may be based at least in part on at least one of an MCS, a rank, a waveform, a resource allocation, a transmit diversity scheme, or a combination thereof for each mini-slot of the set of aggregated mini-slots.

In some examples of the method, apparatus, and non-transitory computer-readable medium described above, the MCS, the rank, the waveform, the resource allocation, or the transmit diversity scheme for a first mini-slot of the set of aggregated mini-slots may be different than the MCS, the rank, the waveform, the resource allocation, or the transmit diversity scheme for a second mini-slot of the set of aggregated mini-slots.

In some examples of the method, apparatus, and non-transitory computer-readable medium described above, the reference signal configuration for a first mini-slot of the set of aggregated mini-slots may be different from the reference signal configuration for a second mini-slot of the set of aggregated mini-slots.

In some examples of the method, apparatus, and non-transitory computer-readable medium described above, the reference signal configuration for a first mini-slot of the set of aggregated mini-slots may be based at least in part on a degree of puncturing for the first mini-slot.

In some examples of the method, apparatus, and non-transitory computer-readable medium described above, the degree of puncturing for the first mini-slot may be based at least in part on an additional signal configured for the at least one mini-slot.

In some examples of the method, apparatus, and non-transitory computer-readable medium described above, the reference signal configuration may be determined based at least in part on a spectral efficiency, a number of REs, a fractional TBS, a ratio of TBS and number of REs, a rank, a waveform, a transmit diversity scheme, or any combination thereof.

Some examples of the method, apparatus, and non-transitory computer-readable medium described above may further include processes, features, means, or instructions for determining the fractional TBS for a first mini-slot of the set of aggregated mini-slots based at least in part on a number of REs associated with the set of aggregated mini-slots, a modulation order of each mini-slot of the set of aggregated mini-slots, a rank of each mini-slot of the set of aggregated mini-slots, a degree of puncturing of each mini-slot of the set of aggregated mini-slots, a rate-matching scheme for each mini-slot of the set of aggregated mini-slots, or any combination thereof, wherein a portion of the at least one data payload may be allocated to the first mini-slot based at least in part on the fractional TBS.

Some examples of the method, apparatus, and non-transitory computer-readable medium described above may further include processes, features, means, or instructions for determining a degree of puncturing for at least one mini-slot of the set of aggregated mini-slots, wherein divisions of the at least one mini-slot are based at least in part on the determined degree of puncturing.

In some examples of the method, apparatus, and non-transitory computer-readable medium described above, the reference signal pattern may be shared between multiple mini-slots of the set of aggregated mini-slots.

In some examples of the method, apparatus, and non-transitory computer-readable medium described above, a reference signal waveform for a first mini-slot of the set of aggregated mini-slots may be different than the reference signal waveform for a second mini-slot of the set of aggregated mini-slots.

Some examples of the method, apparatus, and non-transitory computer-readable medium described above may further include processes, features, means, or instructions for identifying at least one grant that comprises information common to multiple mini-slots of the set of aggregated mini-slots, wherein downlink control information (DCI) corresponding to the multiple mini-slots may be based at least in part on the information common to the multiple mini-slots.

Some examples of the method, apparatus, and non-transitory computer-readable medium described above may further include processes, features, means, or instructions for identifying the at least one grant may be based at least in part on identification of an indicator that points to the at least one grant.

In some examples of the method, apparatus, and non-transitory computer-readable medium described above, the indicator that points to the at least one grant may be included in the DCI corresponding to the multiple mini-slots.

In some examples of the method, apparatus, and non-transitory computer-readable medium described above, the information common to the multiple mini-slots comprises a waveform characteristic, a resource block allocation, a rank, or a combination thereof.

In some examples of the method, apparatus, and non-transitory computer-readable medium described above, the DCI comprises one or more shortened fields corresponding to the information common to the multiple mini-slots.

In some examples of the method, apparatus, and non-transitory computer-readable medium described above, the at least one grant consists of a single grant.

In some examples of the method, apparatus, and non-transitory computer-readable medium described above, the reference signal configuration for the multiple mini-slots may be determined based at least in part on the DCI corresponding to the multiple mini-slots.

Some examples of the method, apparatus, and non-transitory computer-readable medium described above may further include processes, features, means, or instructions for determining one or more scheduling parameters for each mini-slot of the set of aggregated mini-slots and a separation between at least two mini-slots of the set of aggregated mini-slots, wherein the reference signal configuration may be determined based at least in part on the scheduling parameter and the separation.

Some examples of the method, apparatus, and non-transitory computer-readable medium described above may further include processes, features, means, or instructions for determining whether to share the reference signal pattern between two mini-slots of the set of aggregated mini-slots based at least in part on one or both of a time separation and a frequency separation between the two mini-slots.

In some examples of the method, apparatus, and non-transitory computer-readable medium described above, a plurality of mini-slots of the set of aggregated mini-slots may be contiguous and may have the same resource allocation.

Some examples of the method, apparatus, and non-transitory computer-readable medium described above may further include processes, features, means, or instructions for allocating the at least one data payload may be based at least in part on a single grant message.

In some examples of the method, apparatus, and non-transitory computer-readable medium described above, the reference signal pattern may be shared between multiple mini-slots of the set of aggregated mini-slots.

Some examples of the method, apparatus, and non-transitory computer-readable medium described above may further include processes, features, means, or instructions for determining, based at least in part on a single grant message, one or more scheduling parameters common to multiple mini-slots of the set of aggregated mini-slots, wherein the reference signal pattern may be based at least in part on the one or more scheduling parameters.

In some examples of the method, apparatus, and non-transitory computer-readable medium described above, the allocation of the at least one data payload or the determination of the reference signal configuration may be based at least in part on an MCS for each mini-slot of the set of aggregated mini-slots.

In some examples of the method, apparatus, and non-transitory computer-readable medium described above, the MCS for a first mini-slot may be different than the MCS for a second mini-slot.

Some examples of the method, apparatus, and non-transitory computer-readable medium described above may further include processes, features, means, or instructions for encoding the set of aggregated mini-slots based at least in part on a frequency-first mapping scheme or a time-first mapping scheme, wherein transmission of the one or more reference signals and the at least one data payload may be based at least in part on the encoding.

Some examples of the method, apparatus, and non-transitory computer-readable medium described above may further include processes, features, means, or instructions for scheduling each of the set of aggregated mini-slots via respective grant messages or via a single grant message.

In some examples of the method, apparatus, and non-transitory computer-readable medium described above, a first mini-slot of the set of aggregated mini-slots may have a bandwidth different from a second mini-slot of the set of aggregated mini-slots.

In some examples of the method, apparatus, and non-transitory computer-readable medium described above, the one or more reference signals comprise a demodulation reference signal (DMRS), a phase tracking reference signal (PTRS), a time tracking reference signal, or a frequency tracking reference signal.

DETAILED DESCRIPTION

Figure 1:
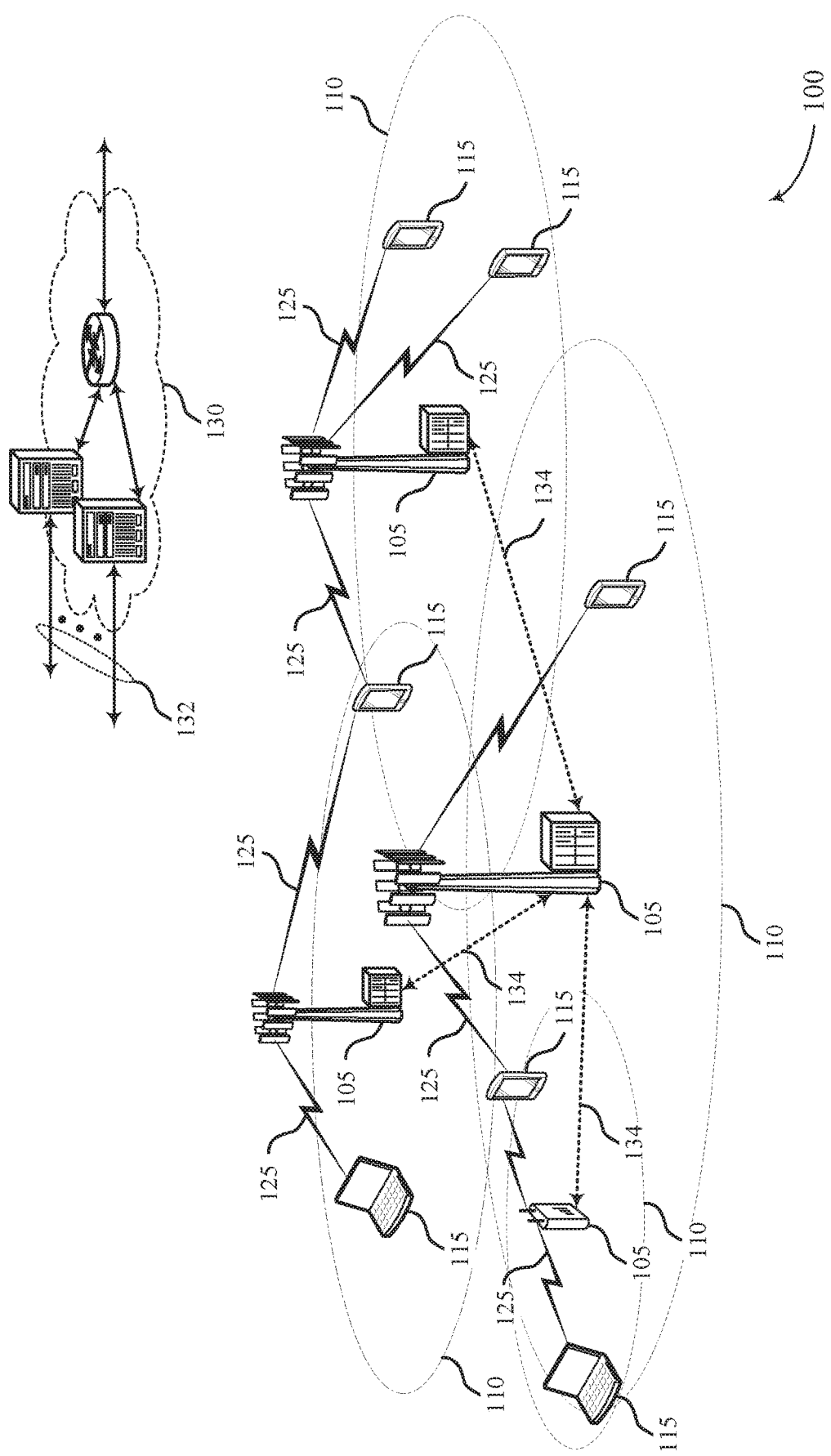
FIG. 1 illustrates an example of a system for wireless communication that supports reference signal design in accordance with aspects of the present disclosure.

In wireless communications systems, time division duplexing (TDD) may be implemented for different communications by allocating time slots for either uplink, downlink, sidelink, or switching between communications. This may allow for an asymmetric flow for uplink and downlink communications based on time resources available and whether a set of time slots has been allocated for uplink or downlink. In such cases, a timing structure may be used to maintain synchronization and manage data transmission between a base station and a user equipment (UE).

In some cases, a wireless communications system operating in millimeter wave (mmW) spectrum, or a shared or unlicensed spectrum of a New Radio (NR) network, may schedule data transmission over multiple timing intervals (e.g., slots, mini-slots, subframes), and this may be referred to as aggregation. For example, mini-slots with a timing duration less than a slot or a subframe may be utilized to schedule transmissions between a base station and a UE. If a set of mini-slots are aggregated, data payloads may be scheduled to span one or more mini-slots, which mini-slots may or may not be contiguous in time. In the following examples, references to mini-slots are made for sake of brevity, though any other term used to indicate a time duration (e.g., transmission time interval (TTI), slot, subframe) may be considered without departing from the scope of the present disclosure.

In some examples, a slot may include a number of mini-slots (e.g., 2, 3, 4), each of which may include a number of symbols (e.g., 7, 14, 28). A subframe may include a number of slots (e.g., 2, 3, 4) spanning any duration in time and may be referred to as a time period, a slot, a mini-slot, a TTI, or any other term used to describe a time interval. The slot, mini slot, TTI, etc. may be a unit of scheduling and may be used to define timing boundaries. In some cases, one or more symbols of a mini-slot may be the smallest unit of scheduling and the slot, mini-slot, TTI, etc. may include a downlink control region and/or an uplink control region. For instance, multiple TTIs may span a subframe and control symbols (e.g., downlink control symbols or uplink control symbols) corresponding to the multiple TTIs may be divided into smaller symbol durations and transmitted at different locations within the subframe. Aggregated time intervals may include aggregated mini-slots, aggregated slots, etc., or combinations of the same. Thus, and as examples, a set of mini-slots may be aggregated together or may be aggregated along with one or more slots. Reference herein to aggregated mini-slots means that at least one mini-slot is included in the aggregation.

Reference signals (RSs) may be used in uplink and downlink communications to estimate channel quality, assist a receiving device in demodulation, allow channel dependent (or frequency selective) uplink scheduling, etc. Some examples of RSs utilized in wireless communication systems may include a sounding RS (SRS), a demodulation RS (DMRS), a downlink RS (DRS), a phase tracking RS (PTRS), a positioning RS (PRS), a time tracking RS, a frequency tracking RS, etc. In some cases, RSs such as DMRS or PTRS used in slot or mini-slot aggregation may be different than those used in the absence of slot/mini-slot aggregation, for example, due to the non-contiguous nature of the aggregated slots or mini-slots or varying grants or fractional transmit block sizes attributable to different mini-slots.

Aspects of the disclosure are initially described in the context of a wireless communications system. Aspects are also described through mapping schemes, aggregation structures, and mini-slot structures. Aspects of the disclosure are further illustrated by and described with reference to apparatus diagrams, system diagrams, and flowcharts that relate to reference signal design for slot aggregation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. According to some aspects, wireless communications system 100 may employ mini-slot aggregation in which multiple mini-slots may be aggregated together. In such cases, an RS configuration may be shared between multiple mini-slots and may be determined based on a modulation coding scheme (MCS), rank, or a transmit diversity scheme, for each of the multiple mini-slots. Data payloads may be jointly scheduled for a set of aggregated mini-slots or separately scheduled for each of the mini-slots. Other types of aggregation (e.g., slot aggregation) may be considered without departing from the scope of the present disclosure.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head (RH), or a transmission/reception point (TRP). In some configurations, various functions of each access network entity or base station 105 may be distributed across various network devices (e.g., RHs and access network controllers (ANCs)) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of enhanced component carrier (eCC) symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
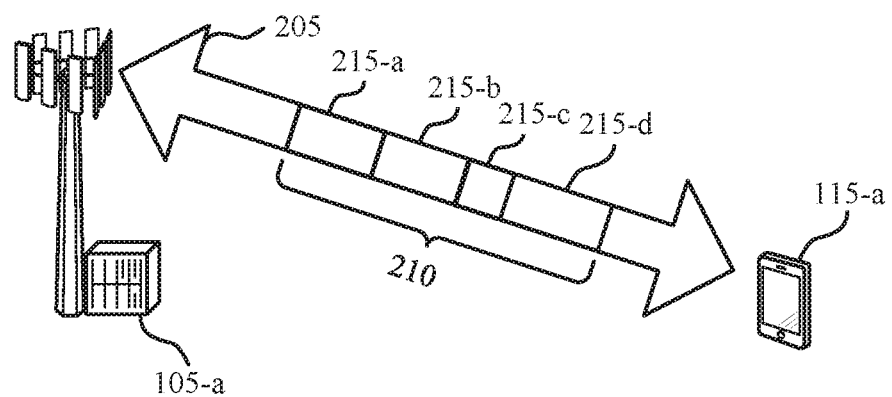
FIG. 2 illustrates an example of a wireless communications system that supports reference signal design in accordance with aspects of the present disclosure.

FIG. 2 illustrates an example of a wireless communications system 200 that supports RS design in accordance with various aspects of the present disclosure. In some examples, wireless communications system 200 may implement aspects of wireless communication system 100. The wireless communications system 200 may operate in the mmW spectrum or a shared or unlicensed spectrum (e.g., of an NR network).

Wireless communications system 200 may include a UE 115-a and a base station 105-a, which may be examples of the UE 115 and base station 105 described with reference to FIG. 1. Base station 105-a and UE 115-a may send and receive messages over a communications link 205, which may implement TDD, and utilize one or more aggregated mini-slots (e.g., aggregated mini-slot 210). The aggregated mini-slot 210 may be divided into multiple mini-slots 215 (e.g., mini-slot 215-a, mini-slot 215-b, mini-slot 215-c, and mini-slot 215-d). In some cases, each of the mini-slots 215 may carry one or more reference signals, a data payload, or a combination thereof.

In some cases, wireless communications system 200 may schedule data transmission over one or more of these mini-slots 215. In some cases, each of the mini-slots 215, within the aggregated mini-slot 210, may span the same length in time and/or have the same bandwidth allocation. Further, mini-slots 215 may or may not be contiguous in time.

The configuration of RSs (e.g., DMRS, PTRS, time tracking RS, frequency tracking RS) transmitted in a wireless communications system 200 that employs mini-slot aggregation may be different than the configurations used in the absence of mini-slot aggregation (e.g., due to the non-contiguous nature of mini-slots 215 or varying grants or fractional transmit block sizes (TBSs) attributable to different mini-slots 215). In a first example deployment scheme of RS transmission for mini-slot aggregation, the duration of a transmission (e.g., the TTI) may be extended by aggregation of the mini-slots 215 (e.g., mini-slot 215-a, mini-slot 215-b, mini-slot 215-c, or mini-slot 215-d, or a combination thereof). In some aspects, for a given bandwidth allocation, a longer or extended TTI may be utilized for enhanced frequency diversity.

Mini-slot aggregation may also serve to decrease the overhead associated with uplink and downlink switching times, or beam switching. For instance, to prevent collision or overlap of an uplink and a downlink transmission, a guard interval may be utilized to separate the two. Extension of the TTI by aggregation of two or more mini-slots 215 (e.g., mini-slot 215-a, mini-slot 215-b, mini-slot 215-c, and mini-slot 215-d) into aggregated mini-slot 210 may serve to decrease instances of the guard interval, thus optimizing overhead. In some cases, the data pre-coding or beam direction may be different across different mini-slots 215, and there may be no RS sharing across the mini-slots 215. In such cases, the design for an RS such as a DMRS or PTRS for each of the mini-slots 215 may be the same, or may follow a similar structure to a non-aggregated case.

In some examples, the data payload and modulation symbols may be mapped over one or more mini-slots 215. The modulation order and rank of the MCS may be different for one or more mini-slots 215 (e.g., mini-slot 215-a and mini-slot 215-b) and the resource block (RB) allocation, beam parameters (e.g., beamwidth, beam direction, etc.), or waveform may be the same or different across the mini-slots 215. In some cases, the pattern or density of RSs for the non-aggregated mini-slots 215 may be based on one or more factors or rules, such as the MCS, waveform, etc. The RS pattern or density may be based in part on the modulation order or rank for each individual mini-slot 215 (e.g., mini-slot 215-a, mini-slot 215-b, mini-slot 215-c, and mini-slot 215-d). In such cases, the modulation order or rank for each of the mini-slots 215 may be utilized to obtain the pattern or density for a RS to be transmitted in that individual mini-slot 215.

According to some aspects, the pattern or density for the RS may be based in part on a TBS, spectral efficiency, or ratio of a TBS to the number of resource elements (REs). In such cases, for each of the mini-slots 215 comprising the aggregated mini-slot 210, a fractional TBS representing the portion of the data payload carried in an individual mini-slot 215 (e.g., mini-slot 215-a, mini-slot 215-b, mini-slot 215-c, or mini-slot 215-d) to the number of REs in the mini-slot 215, may be derived. In some cases, the fractional TBS may be different for the different mini-slots 215, and may account for the number of REs, modulation-order, rank, data payload, etc., for each mini-slot 215. Furthermore, in some cases, the spectral efficiency for each mini-slot 215 may be calculated or estimated by dividing the TBS or the fractional TBS of an individual mini-slot 215 by the number of REs in the mini-slot 215. In such cases, the pattern or densities for the RSs in a mini-slot 215 may then be mapped using the spectral efficiency estimated for that mini-slot 215.

In some cases, modulated symbols ready for populating a mini-slot 215 may be mapped on to REs allocated for the mini-slot 215. In some instances, one or more of the modulated symbols may overlap with another RS. To account for the overlap during modulation mapping, a subset of the modulated symbols populating the mini-slot 215 may be replaced, for example, by another RS such as a channel state information RS (CSI-RS) or a sounding RS (SRS) on the uplink. This technique may be referred to as puncturing, and the REs may be referred to as punctured REs. In some other cases, modulation mapping may involve rate matching. In such cases, modulated symbols may be populated in a time-first or frequency-first manner onto REs while tracking and identifying the REs allocated to a different channel. Following identification of an RE allocated to another channel or RS, the modulated symbol may not be mapped on to that RE. In some examples, different mini-slots 215 may have different levels of puncturing or overlap by other RSs such as CSI-RS or SRS. In such cases, the punctured REs may or may not be omitted from the count of REs used to estimate or calculate the fractional TBS or spectral efficiency. In some cases, the determination of updating or altering the count of REs may be based in part on the techniques for non mini-slot aggregation or whether the modulation mapping involves puncturing or rate matching.

In another example deployment scheme, an RS may be shared across the aggregated mini-slot 210. In some cases, each of the mini-slots 215 may carry its own independently scheduled data payload. Further, the aggregated mini-slot 210, which may comprise a combination of each of the independently scheduled data payloads, may be repeated over multiple slots. In some cases, RS sharing across the aggregated mini-slot 210 may involve a level of continuity or unity across frequency or time resources, beam parameters, or pre-coding between the mini-slots 215 constituting the aggregated mini-slot 210, but different mini-slots 215 may use the same or different waveforms. For example, a first subset of mini-slots 215 (e.g., mini-slot 215-a and mini-slot 215-c) from the aggregated mini-slot 210 may use a Cyclic Prefix Orthogonal Frequency Division Multiplexing (CP-OFDM) waveform, while a second subset of mini-slots 215 (e.g., mini-slot 215-b and mini-slot 215-d) may use a Discrete Fourier Transform-spread-OFDM (DFT-s-OFDM). In some instances, the channel-estimator complexity may be optimized by using the same waveform across the mini-slots 215.

In some cases, scheduling mini-slots 215 via the downlink control information (DCI) in a downlink control channel (e.g., Physical Downlink Control Channel (PDCCH)) may allow for skipping or shortening one or more fields common to the mini-slots 215 (and constituting the aggregated mini-slot 210). For example, the DCI field may carry information pertaining to waveform, RB allocation, rank, MCS, etc. In some examples, the mini-slots 215 may have common scheduling parameters such as RB allocation, frequency, rank, etc. In such cases, skipping one or more fields common to the mini-slots 215 may serve to optimize utilization of downlink resources. Thus, in some cases, one DCI amongst the one or more DCIs used for scheduling the mini-slots 215 may carry information pertaining to the common scheduling parameters. In some aspects, the remainder of DCIs may skip carrying information or fields pertaining to the common scheduling parameters, or may only carry a portion of the information. In such instances, the downlink control channel may comprise an indicator pointing to the DCI or an uplink grant carrying the common information. If the DCI or the uplink grant carrying the common information is missed or dropped, subsequent grants may not be able to be processed. In such cases, each of the mini-slots 215 may be scheduled via a single uplink grant and each DCI used to schedule a mini-slot 215 amongst the multiple mini-slots 215 may carry the common scheduling parameters.

In some cases, RS design for the mini-slots 215 may involve a suitable RS pattern or density for the aggregated slot 210 or TTI. In some cases, for non-aggregated mini-slots 215, an RS allocation may be indicated in DCI. Furthermore, the allocation of the RS may be explicit or implicit based on one or more parameters such as rank, waveform, MCS, etc. In some cases, a similar scheme may be applied for the aggregated set of mini-slots 215 (or aggregated mini-slot 210). For example, an implicit RS selection in the case for mini-slots 215 constituting an aggregated mini-slot 210 may involve an indication of scheduling parameters for each of the individual mini-slots 215 (similar to the non-aggregated case), in addition to additional parameters that indicate time or frequency separation between the mini-slots 215.

In another example deployment scheme, an RS may be shared across the aggregated mini-slot 210 with joint scheduling of a data payload across the aggregated mini-slot 210. For example, in some cases, the data payload from a single grant may be encoded and modulation symbols may be mapped across the aggregated mini-slot 210. In some cases, one or more of the scheduling parameters, which may be used to determine selection of the RS, may be the same across the mini-slots 215 due to a single grant and data payload spread across the aggregated mini-slot 210. In some cases, this may serve to optimize the RS selection process. In some other cases, one or more of the scheduling parameters (e.g., rank or modulation order) may be different from one mini-slot 215 to the next.

Figure 3:
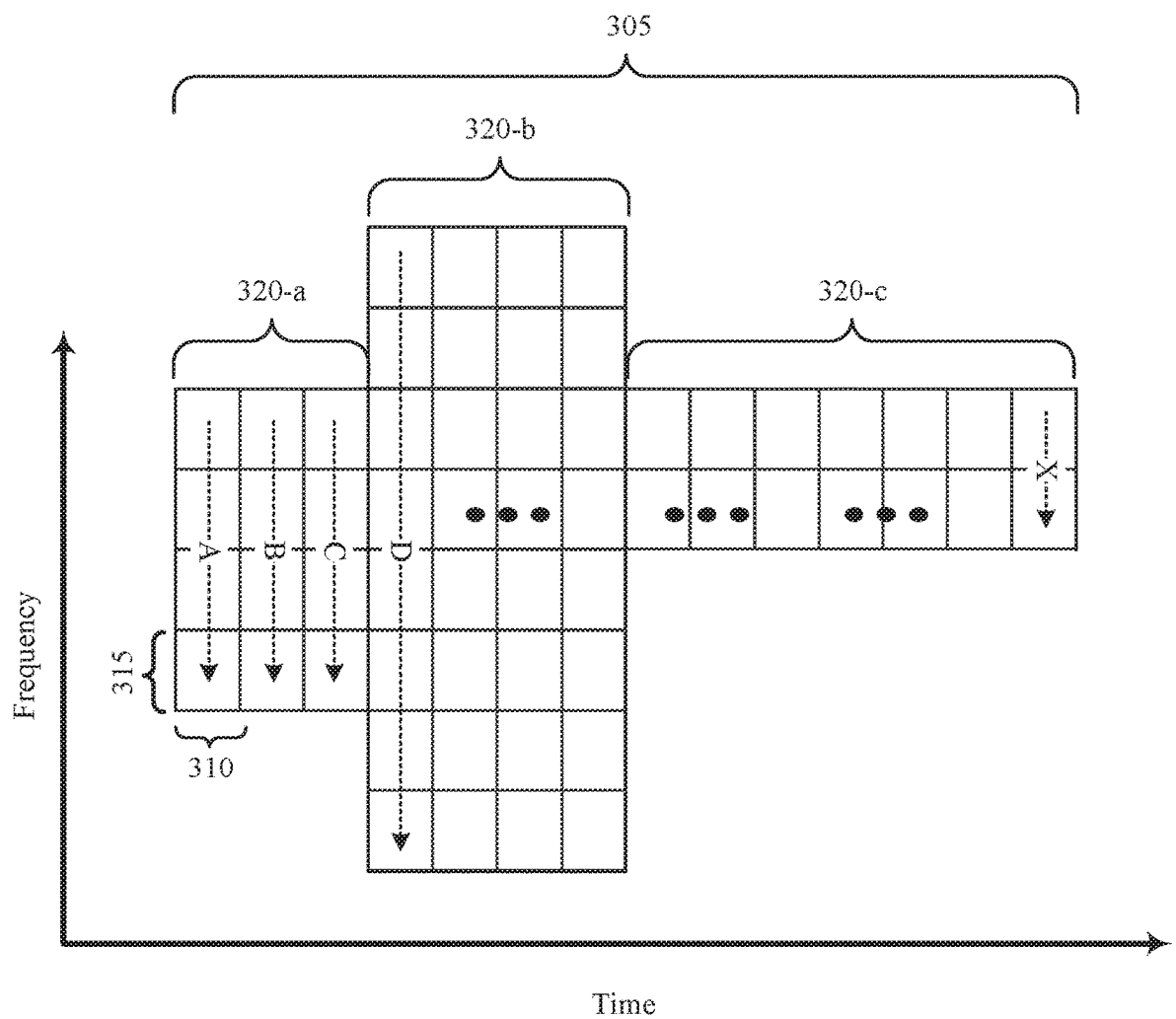
FIG. 3 illustrates an example of a mapping scheme that supports reference signal design in accordance with aspects of the present disclosure.

FIG. 3 illustrates an example of a mapping scheme 300 that supports RS design in accordance with various aspects of the present disclosure. In some examples, mapping scheme 300 may implement aspects of wireless communications system 100 or 200, as described with reference to FIGS. 1 and 2. Mapping scheme 300 may utilize an aggregated mini-slot 305, which may be an example of the aggregated mini-slot 210 described with reference to FIG. 2. The aggregated mini-slot 305 may be divided into separate mini-slots 320 (e.g., mini-slot 320-a, mini-slot 320-b, and mini-slot 320-c) each carrying one or more RSs, a data payload, or a combination thereof. Furthermore, each of the mini-slots 320 may include time and frequency resources designated by one or more time increments 310 (e.g., symbols) and one or more frequency increments 315 (e.g., sub-carriers), which may be represented as a time-frequency grid. It should be understood that other increments of time and frequency may be used (e.g., depending on the type of wireless system employed) and each of these mini-slots 320, within the aggregated mini-slot 305, may span the same or different time duration or frequency bandwidth. In some cases, mini-slots 320 may or may not be contiguous in time.

In some examples, a transmitting device such as a UE or base station may interleave or otherwise populate the aggregated mini-slot 305 such that certain regions or mini-slots 320 (e.g., mini-slot 320-a, or mini-slot 320-b, or mini-slot 320-c) are transmitted and received before others. In each mini-slot 320, the modulation symbols may be populated using a frequency-first scheme, which indicates how the RSs and symbols of data are spread or grouped across the time and frequency resources within a mini-slot 320. Such mapping may affect the order in which the modulated data is received or decoded. As illustrated, in a frequency-first scheme, symbols may be arranged along the frequency dimension for a given time increment 310 before other time resources are populated. In some cases, frequency-first mapping may include populating a contiguous band of frequency resources (e.g., across multiple sub-carriers 315) with a particular type of information (e.g., control information, data, or RSs) and for a given time increment 310. Frequency-first population or mapping may involve populating an entire mini-slot 320 (e.g., mini-slot 320-a) prior to proceeding to the next mini-slot 320 (e.g., mini-slot 320-b). For example, modulation symbols may be populated frequency first in direction A (first time increment), followed by direction B (second time increment), and so on until direction X (last time increment for the mini-slot 320-c).

Figure 4A:
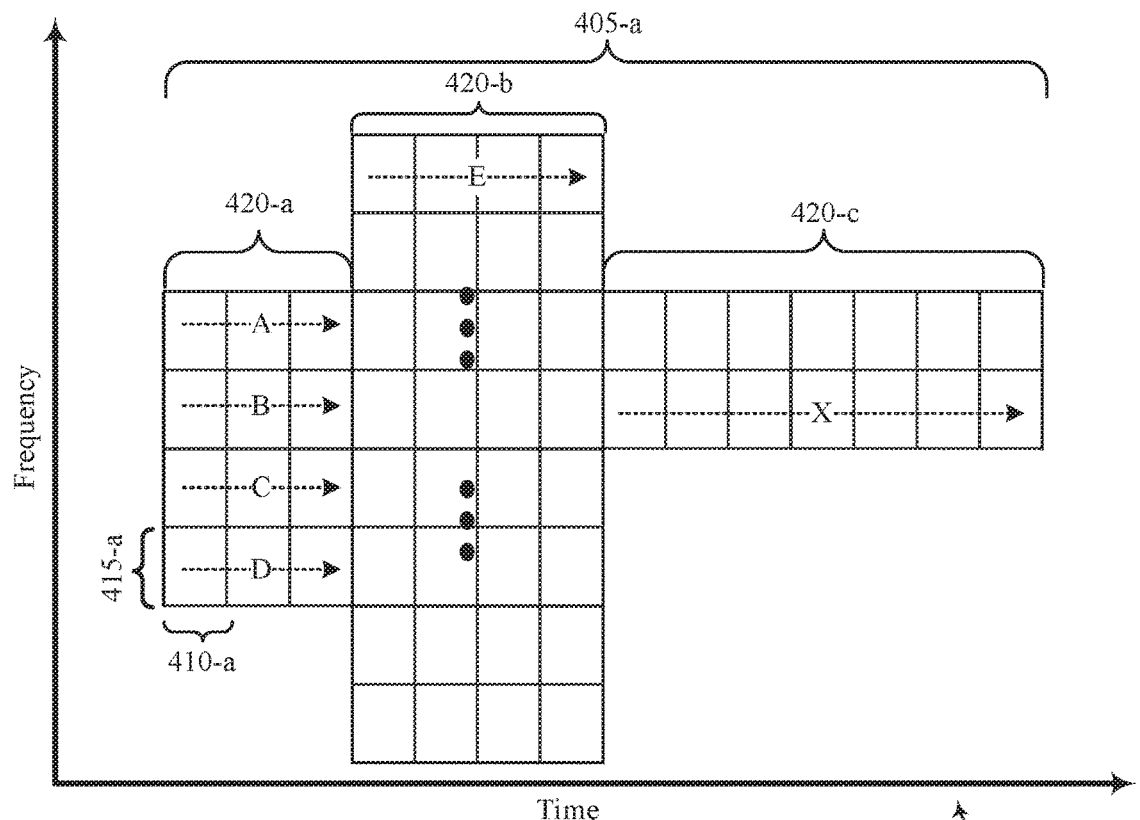
FIGS. 4A and 4B illustrate example mapping schemes that support reference signal design in accordance with aspects of the present disclosure.
Figure 4B:
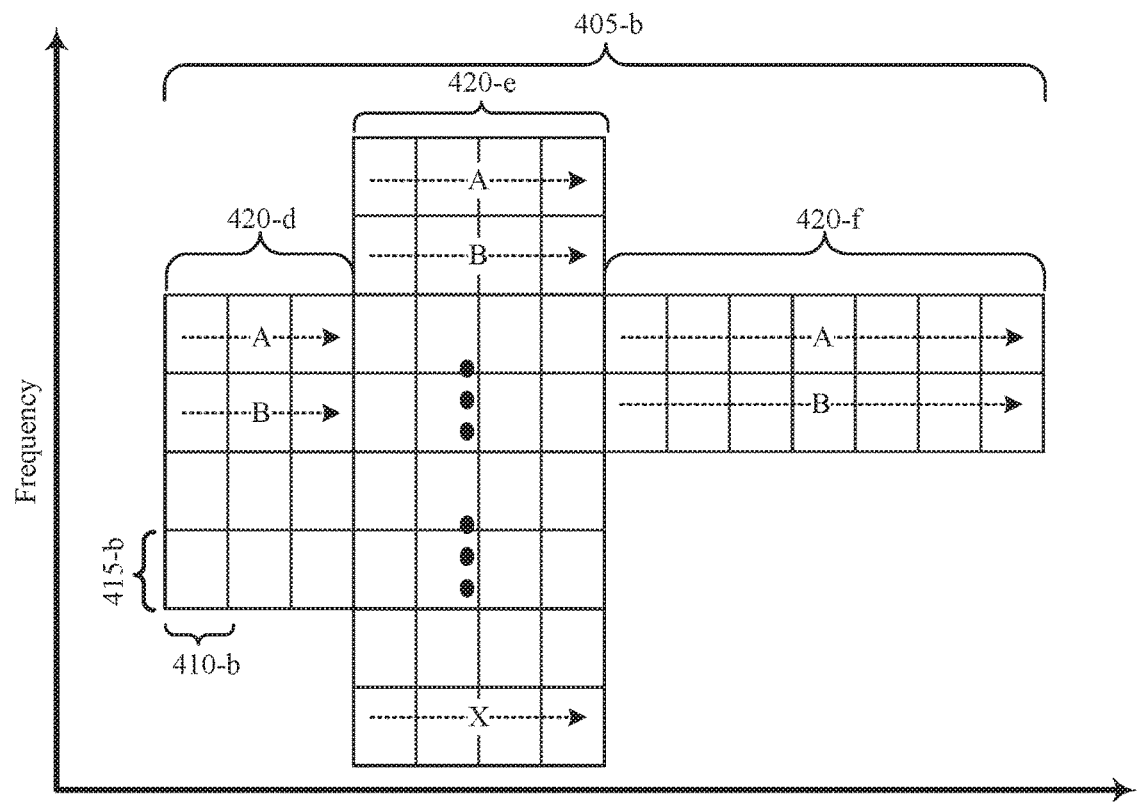

FIGS. 4A and 4B illustrate example mapping schemes 401 and 402 that support RS design in accordance with various aspects of the present disclosure. In some examples, mapping schemes 401 and 402 may implement aspects of wireless communications system 100 or 200 as described with reference with FIGS. 1 and 2.

As shown in FIG. 4A, mapping scheme 401 may contain an aggregated mini-slot 405-a, which may be an example of the aggregated mini-slot 210 described with reference to FIG. 2. The aggregated mini-slot 405-a may be divided into separate mini-slots 420 (e.g., mini-slot 420-a, mini-slot 420-*b*, and mini-slot 420-*c*) each carrying one or more RSs, a data payload, or a combination thereof. Furthermore, each of the mini-slots 420 may include time and frequency resources such as one or more time increments 410-*a* (e.g., symbols) and one or more frequency increments 415-*a* (e.g., sub-carriers), which may be represented as a time-frequency grid. It should be understood that other increments of time and frequency may be used (e.g., depending on the type of wireless system employed). The length in time and frequency allocation of these mini-slots 420 may be of the same or different time duration or frequency bandwidth. In some examples, mini-slots 420 may or may not be contiguous in time.

In some cases, a transmitting device such as a UE or base station may interleave or otherwise populate the aggregated mini-slot 405-*a* such that certain regions or mini-slots 420 (e.g., mini-slot 420-*a*, or mini-slot 420-*b*, or mini-slot 420-*c*) are transmitted and received before others. In each mini-slot 420, the symbols may be populated using a time-first scheme, which refers to how the RSs and symbols of data are spread or grouped across the time and frequency resources within a mini-slot 420. The type of mapping scheme may affect the order in which these symbols are received or decoded. As illustrated, in a time-first scheme, symbols may be populated along the time dimension for a given frequency increment 415-*a* before other frequency resources are populated. In some cases, time-first population may include populating a contiguous band of time resources (e.g., not skipping any time increments 410-*a*) with a particular type of information (e.g., control information, data, or RSs) within a given frequency increment 415-*a*. Furthermore, in some cases, time-first population or mapping may be employed sequentially across mini-slots, wherein the process may involve populating an entire mini-slot 420 (e.g., mini-slot 420-*a*) prior to proceeding to the next mini-slot 420 (e.g., mini-slot 420-*b*). For example, modulation symbols may be populated frequency first in direction A, followed by directions B, C, D, E, and so on until direction X.

As shown in FIG. 4B, mapping scheme 402 may contain an aggregated mini-slot 405-*b*, which may be an example of the aggregated mini-slot 210 described with reference to FIG. 2. The aggregated mini-slot 405-*b* may be divided into separate mini-slots 420 (e.g., mini-slot 420-*d*, mini-slot 420-*e*, and mini-slot 420-*f*) each carrying one or more RSs, a data payload, or a combination thereof. Furthermore, each of the mini-slots 420 may include time and frequency resources such as one or more time increments 410-*b* (e.g., symbols) and one or more frequency increments 415-*b* (e.g., sub-carriers), which may be represented as a time-frequency grid. It should be understood that other increments of time and frequency may be used (e.g., depending on the type of wireless system employed). The length in time and width of frequency allocation of these mini-slots 420 may be the same or different. In some cases, mini-slots 420 may or may not be contiguous in time.

In each mini-slot 420 of FIG. 4B, the symbols may be populated using a time-first scheme instead of a frequency-first scheme. Time-first population may include populating a contiguous set of time resources with a particular type of information (e.g., control information, data, or RSs) within a given frequency increment 415-*b* per mini-slot 420. Further, in some cases, time-first population or mapping may involve populating across all mini-slots 420 (e.g., mini-slot 420-*a*, 420-*b*, and 420-*c*) for a first frequency increment, prior to proceeding to a second frequency increment 415-*b*. In some cases, this process may be repeated time-first across all mini-slots, and sequentially over all frequency increments. For example, as shown, modulation symbols may be populated frequency first in direction A, followed by direction B, and so on, until direction X.

It should also be noted that a combination of the frequency-first scheme (FIG. 3) and the time-first schemes (FIGS. 4A and 4B) may also be used. For example, the mini-slots may be partitioned into sequentially populated subgroups, and a different mapping may be used in each subgroup.

Figure 5A:
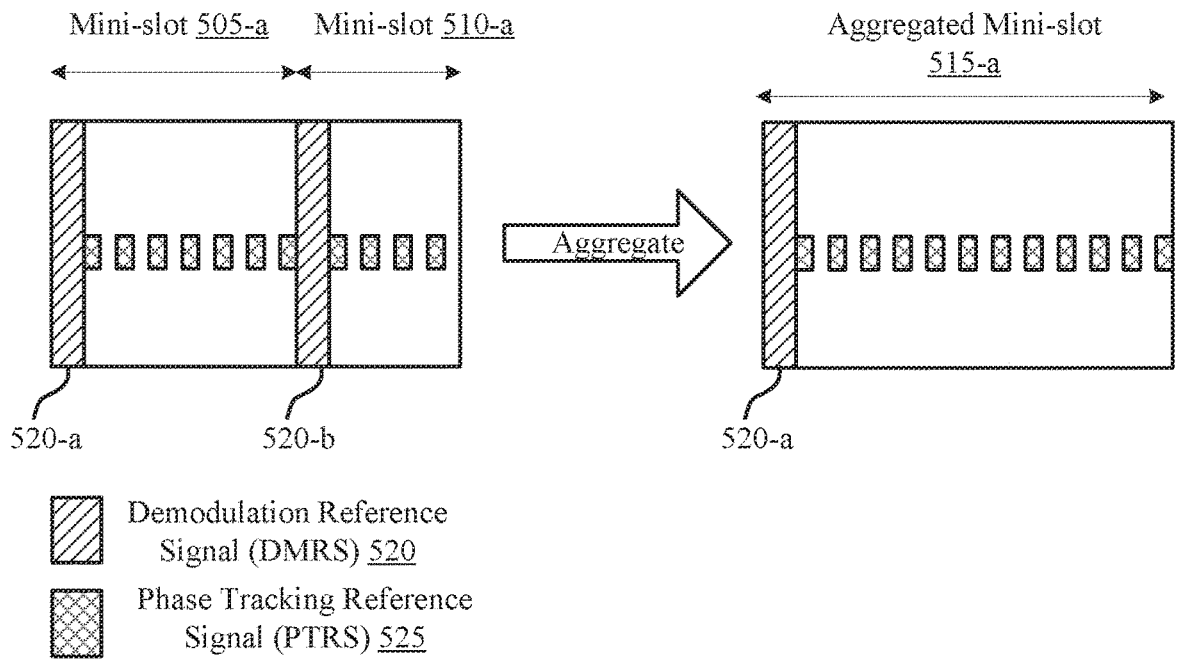
FIGS. 5A and 5B illustrate example aggregation schemes that support reference signal design in accordance with aspects of the present disclosure.
Figure 5B:
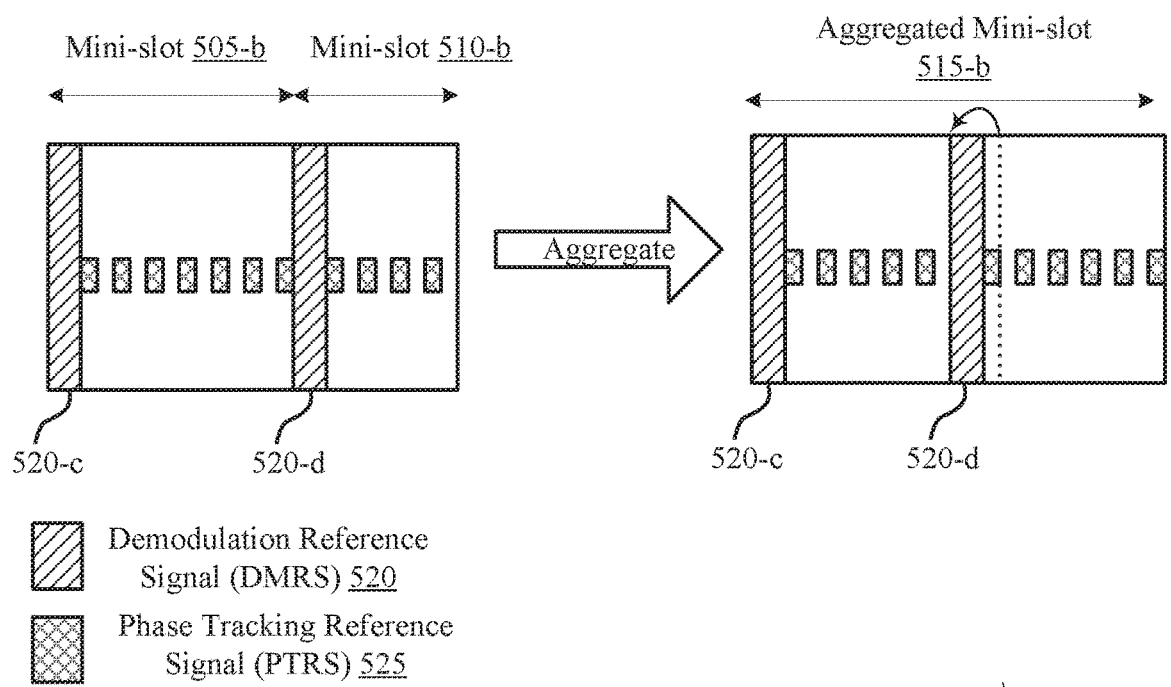

FIGS. 5A and 5B illustrate example aggregation schemes 501 and 502 that support RS design in accordance with various aspects of the present disclosure. In some examples, aggregation schemes 501 and 502 may implement aspects of wireless communication systems 100 or 200, as described with reference to FIGS. 1 and 2. Aggregation scheme 501 of FIG. 5A may include a first mini-slot 505-*a* and a second mini-slot 510-*a*, which may be examples of the mini-slots 215, 320, and 420, as described with reference to FIGS. 2, 3, 4A, and 4B. The first mini-slot 505-*a* and second mini-slot 510-*a* may each carry one or more RSs, a data payload, or a combination thereof. As shown, the first mini-slot 505-*a* and second mini-slot 510-*a* may each carry one or more DMRSs 520 (e.g., DMRS 520-*a* and DMRS 520-*b*) and PTRSs 525.

In accordance with aspects of the present disclosure, the first mini-slot 505-*a* and the second mini-slot 510-*a* may be aggregated to form aggregated mini-slot 515-*a*. In some cases, DMRS 520-*a* and DMRS 520-*b* may be the same, and therefore common amongst the first mini-slot 505-*a* and the second mini-slot 510-*a*. In order to decrease redundancy and optimize RS transmissions for mini-slot aggregation, the aggregated mini-slot 515-*a* may not contain duplicate instances of the common DMRS, and instead, one of DMRS 520-*a* or 520-*b* may be not be transmitted in the aggregated mini-slot 515-*a*. For instance, as shown in FIG. 5A, DMRS 520-*b* may not be transmitted in aggregated mini-slot 515-*a*, and DMRS 520-*a* may occupy the same time and frequency resources as in non-aggregated mini-slot 505-*a*. The resulting reduction in DMRS overhead may allow for the carrying of additional data in the aggregated mini-slot 515-*a*.

FIG. 5B illustrates an example of an aggregation scheme 502 supporting RS design for mini-slot aggregation in accordance with aspects of the present disclosure. The aggregation scheme 502 may contain a first mini-slot 505-*b* and a second mini-slot 510-*b*, which may be examples of the mini-slots 215, 320, and 420 described with reference to FIGS. 2, 3, 4A, and 4B. The first mini-slot 505-*b* and second mini-slot 510-*b* may each carry one or more RSs, a data payload, or a combination thereof. As shown, the first mini-slot 505-*b* and second mini-slot 510-*b* may each carry one or more DMRSs 520 (e.g., DMRS 520-*c* and DMRS 520-*d*) and PTRSs 525.

In accordance with aspects of the present disclosure, the first mini-slot 505-*b* and the second mini-slot 510-*b* may be aggregated to form aggregated mini-slot 515-*b*. In some cases, a DMRS 520 (e.g., DMRS 520-*d*) may be re-positioned during aggregation, for instance, to be symmetrically or evenly positioned across the aggregated mini-slot 515-*b*, as shown.

Figure 6A:
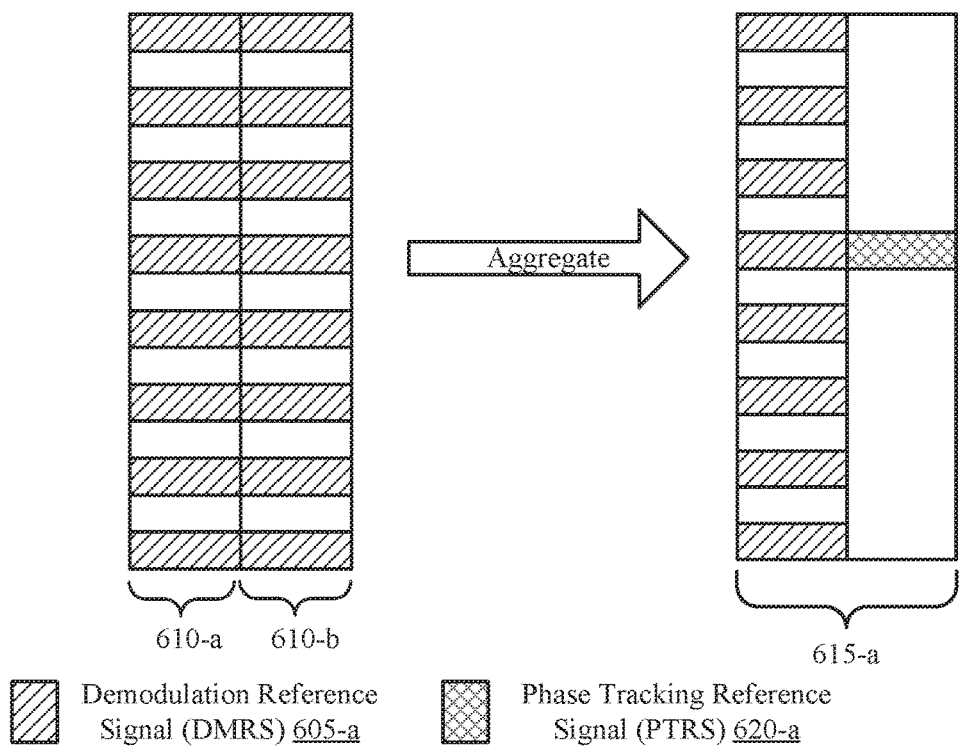
FIGS. 6A and 6B illustrate example reference signal configurations in accordance with aspects of the present disclosure.
Figure 6B:
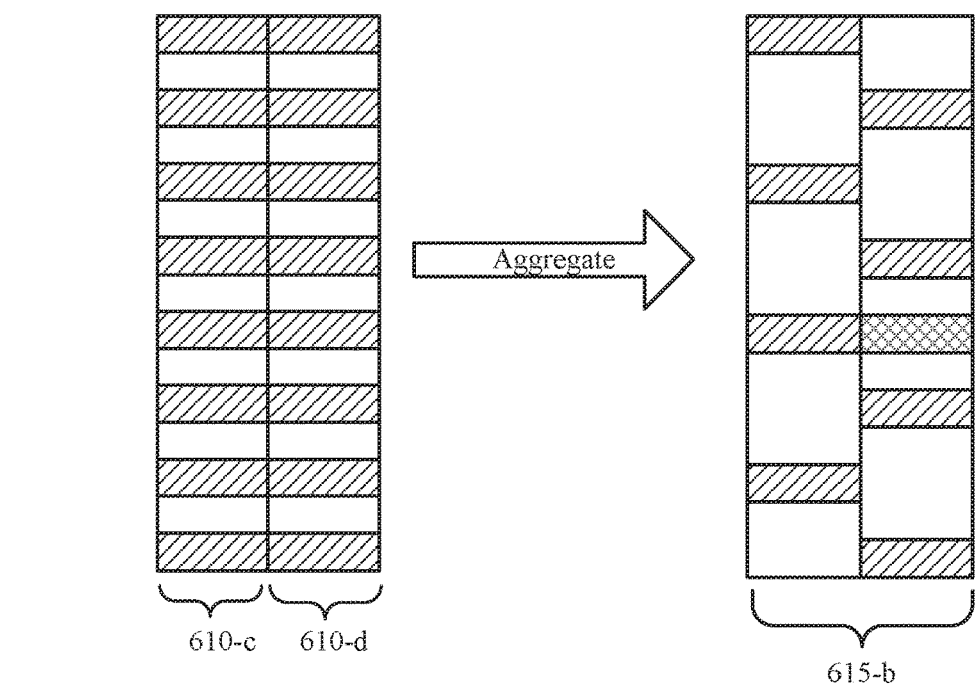

FIGS. 6A and 6B illustrate example RS configurations 601 and 602 that support RS design in accordance with various aspects of the present disclosure. In some examples, RS configurations 601 and 602 may implement aspects of wireless communications system 100 or 200, as described with reference to FIGS. 1 and 2.

As shown in FIG. 6A, RS configurations 601 may contain a mini-slot 610-*a* and a mini-slot 610-*b*, which may be examples of the mini-slots 215, 320, and 420 described with reference to FIGS. 2, 3, 4A, and 4B. Mini-slots 610-*a* and 610-*b* may each carry one or more RSs, a data payload, or a combination thereof. In some cases, neither of mini-slot 610-*a* and mini-slot 610-*b* may carry a PTRS, for instance, due to their time duration not satisfying a threshold duration for transmission of a PTRS. Further, as shown, the first mini-slot 610-*a* and second mini-slot 610-*b* each carry multiple instances of DMRS 605-*a*, which may span across the mini-slots.

In accordance with aspects of the present disclosure, the first mini-slot 610-*a* and the second mini-slot 610-*b* may be aggregated to form aggregated mini-slot 615-*a*. In some cases, aggregation of mini-slots may lead to a phase change between one or more of the mini-slots 610 and the aggregated mini-slot 615-*a*. In such cases, one or more REs comprising a DMRS 605-*a* may be punctured, and replaced by a PTRS 615-*a*, thus allowing for phase tracking. Further, in some cases, the aggregated mini-slot 615-*a* may not contain instances of DMRS 605-*a* previously present in the mini-slot 610-*b* (e.g., due to the common DMRS across the mini-slots 610). For instance, the REs carrying the DMRS 605-*a* in mini-slot 610-*b* may be punctured, or the DMRS 605-*a* may be dropped during mini-slot aggregation. In some examples, the dropped DMRSs are instead replaced by data modulation symbols.

FIG. 6B illustrates an example of an aggregation scheme 602 supporting RS design in accordance with aspects of the present disclosure. The aggregation scheme 602 may contain a first mini-slot 610-*c* and a second mini-slot 610-*d*, which may be examples of the mini-slots 215, 320, and 420 described with reference to FIGS. 2, 3, 4A, and 4B. The first mini-slot 610-*c* and second mini-slot 610-*d* may each carry one or more RSs, a data payload, or a combination thereof. In some cases, the first mini-slot 610-*c* and second mini-slot 610-*d* may not carry a PTRS (e.g., due to their time duration not satisfying a threshold duration for transmission of a PTRS). As shown, the first mini-slot 610-*c* and second mini-slot 610-*d* each carry multiple instances of DMRS 605-*b*, which may span across the mini-slots.

In accordance with aspects of the present disclosure, the first mini-slot 610-*c* and the second mini-slot 610-*d* may be aggregated to form aggregated mini-slot 615-*b*. In some cases, aggregation of mini-slots may inadvertently lead to a phase change between one or more of the mini-slots 610 and the aggregated mini-slot 615-*b*. In some cases, one or more tones spanning across the mini-slots (and carrying a RS) may be maintained during mini-slot aggregation to accommodate a PTRS. For example, one or more REs comprising a DMRS 605-*b* may be punctured, and replaced by a PTRS 615-*b*, thus allowing for tracking phase changes. Furthermore, the density of DMRS 605-*b* in the aggregated mini-slot 615-*b* may be increased or decreased, as compared to the density in the non-aggregated mini-slots, for instance, based on the experienced puncturing. For example, in some cases, the DMRS 605-*b* may be repositioned, or additional REs carrying DMRS may be punctured during mini-slot aggregation. In some cases, DMRS 605-*b*, or PTRS 620-*b* in aggregated mini-slot 615-*b* may need to be punctured and/or repositioned to accommodate higher priority traffic, such as low latency traffic (e.g., for Ultra Reliable Low Latency Communication (URLLC)), which may puncture REs carrying the RSs (not shown).

In some other cases, one or more OFDM symbols of a non-aggregated mini-slot (e.g., first mini-slot 610-*c*, or second mini-slot 610-*d*) may be punctured to divide the mini-slot into two or more divisions, each of which may also be referred to as a mini-slot. In such cases, each of the newly configured mini-slots may not be contiguous in time, due to partial or complete puncturing of a single time-contiguous grant (i.e., non-aggregated mini-slot).

Figure 7:
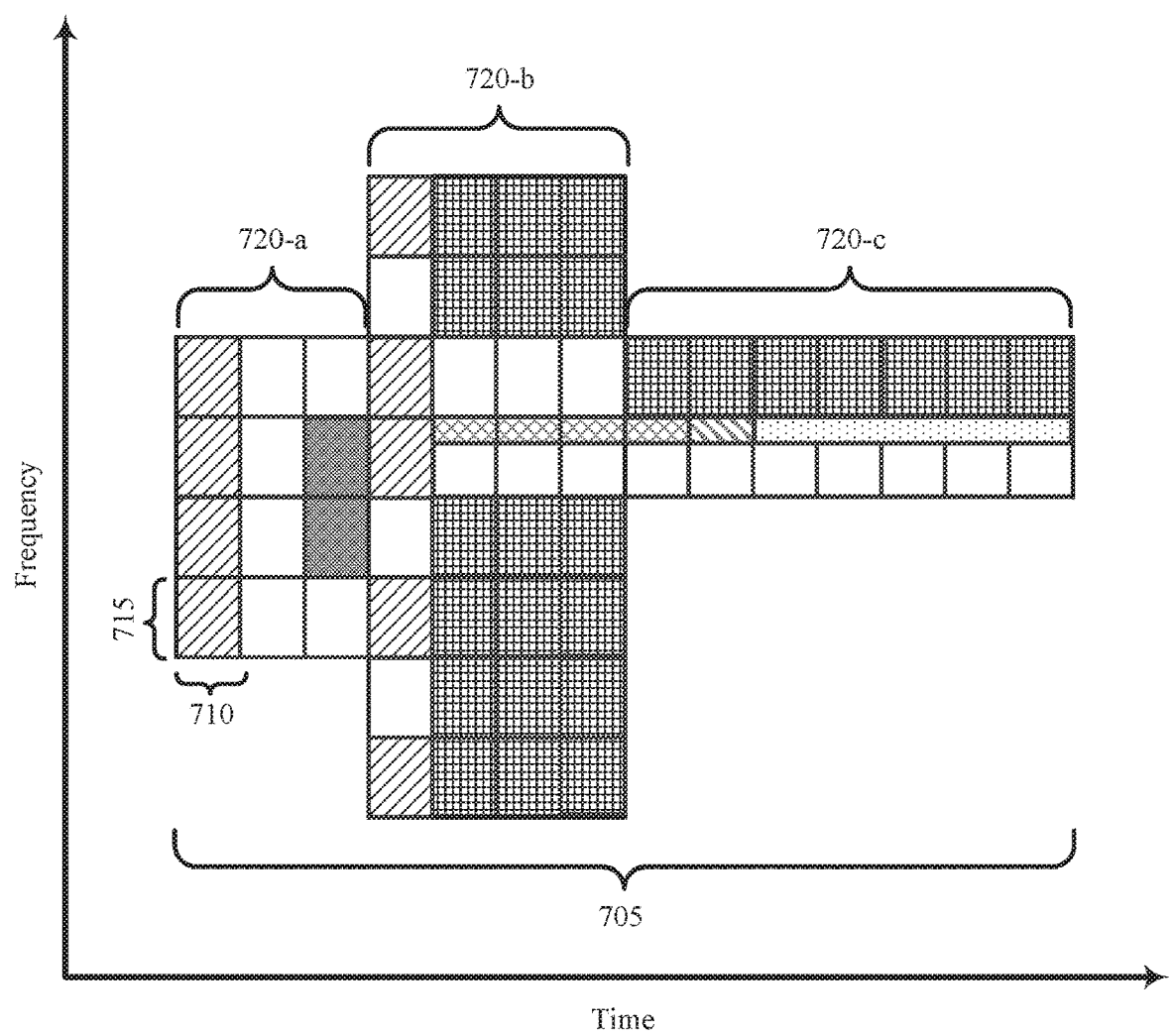
FIG. 7 illustrates an example of a reference signal configuration in accordance with aspects of the present disclosure.

FIG. 7 illustrates an example of an RS configuration 700 in accordance with various aspects of the present disclosure. In some examples, RS configuration 700 may implement aspects of wireless communications system 100 or 200, as described with reference to FIGS. 1 and 2. Further, RS configuration 700 may be deployed using one or more aspects of mapping schemes 300, 401, or 402, and aggregation schemes 501 or 502, as described with reference to FIGS. 3-5.

The RS configuration 700 may contain an aggregated mini-slot 705, which may be an example of the aggregated mini-slot 210 described with reference to FIG. 2. The aggregated mini-slot 705 may be divided into separate mini-slots 720 (e.g., mini-slot 720-*a*, mini-slot 720-*b*, and mini-slot 720-*c*) each carrying one or more RSs, a data payload, or a combination thereof. Further, each of the mini-slots 720 may include time and frequency resources such as one or more time increments 710 (e.g., symbols) and one or more frequency increments 715 (e.g., sub-carriers), which may be represented as a time-frequency grid. It should be understood that other increments of time and frequency may be used (e.g., depending on the type of wireless system employed). The length in time and frequency allocation of these mini-slots 720 may be of the same or different time duration or frequency bandwidth. In some cases, mini-slots 720 may or may not be contiguous in time.

In some examples, a payload (e.g., a data packet, a voice packet) may be allocated to one or more mini-slots 720 of the aggregated mini-slot 705. For instance, a first payload, such as a voice packet, may have a first TBS and may be allocated resources within an individual mini-slot 720-*a*, as shown. The first payload may be allocated resources based on its corresponding TBS, the resources available in mini-slot 720-*a*, the MCS of mini-slot 720-*a*, among other factors. In this example, the first payload is allocated two REs in mini-slot 720-*a*.

In another example, a payload (e.g., a data packet, a voice packet) may be allocated across multiple or all mini-slots 720 of aggregated mini-slot 705. For instance, a second payload, such as a data packet, may have a second TBS and may be allocated across mini-slots 720-*b* and 720-*c* of the aggregated mini-slot 705. The second payload may be allocated resources based on its corresponding TBS, the resources available in mini-slots 720-*b* and 720-*c*, the MCS of mini-slots 720-*b* and 720-*c*, among other factors. In some cases, a fractional TBS for the second payload may be calculated such that a portion of the second payload corresponding to a first fractional TBS is allocated to mini-slot 720-*b* and the remaining portion of the second payload (e.g., corresponding to a second fractional TBS) is allocated to mini-slot 720-*c*.

In some cases, an RS configuration may include a DMRS that occupies the entire frequency bandwidth allocated for mini-slot 720-*a* and a portion of the time resources (e.g., time segment 710). In mini-slot 720-*b*, the DMRS and PTRS may each occupy a portion of the time and frequency resources and in some instances, may overlap with another RS. For example, as shown in FIG. 7, the overlapping RS (e.g., PTRS) may be punctured in mini-slot 720-*c* such that the resources carrying PTRS may be allocated to accommodate a CSI-RS during mini-slot aggregation.

Figure 8:
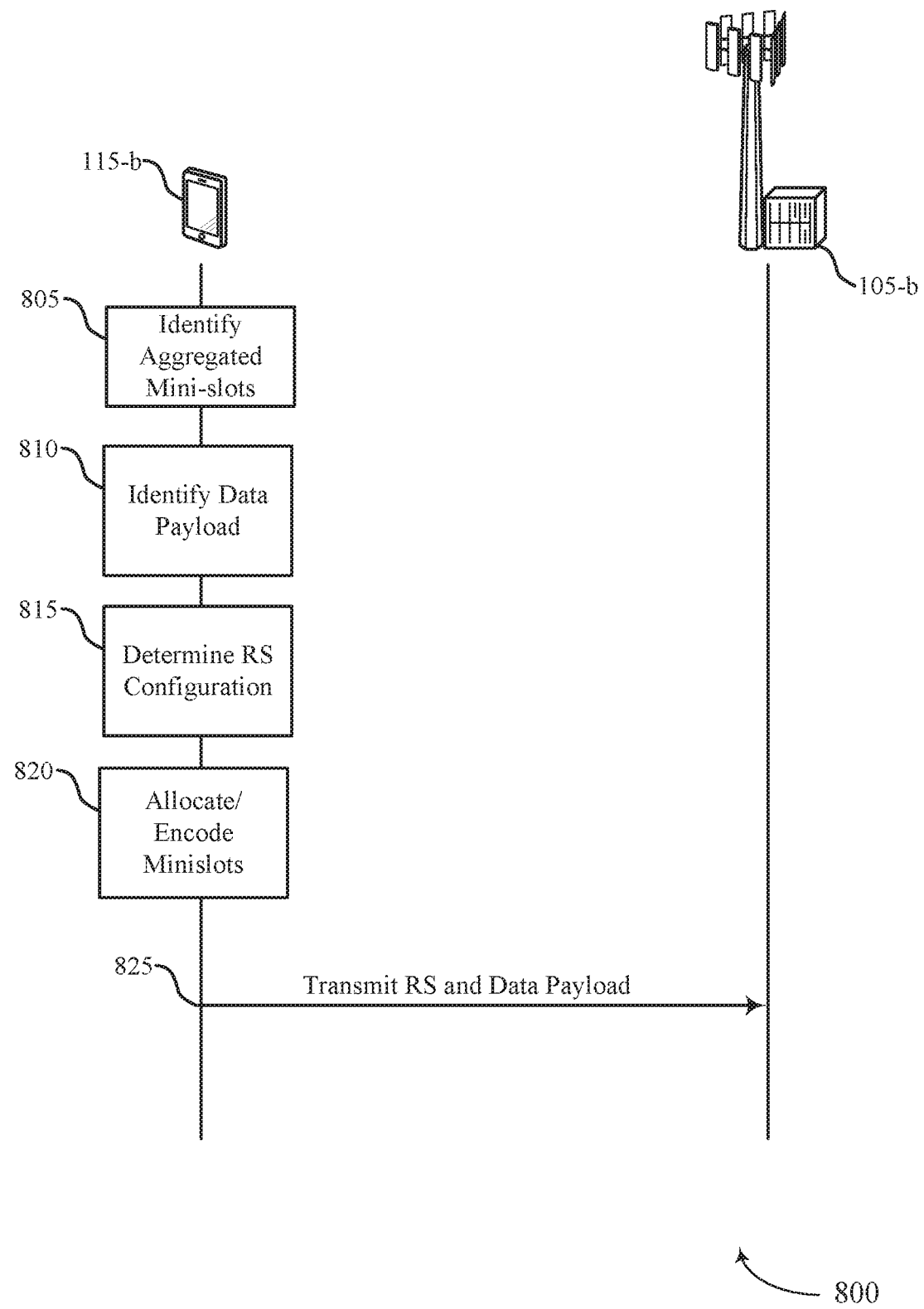
FIG. 8 illustrates an example of a process flow in accordance with aspects of the present disclosure.

FIG. 8 illustrates an example of a process flow 800 in accordance with various aspects of the present disclosure. In some examples, process flow 800 may implement aspects of wireless communication system 100 or 200, as described with reference to FIGS. 1 and 2. Process flow 800 may be performed between a UE 115-*b* and a base station 105-*b* supporting RS design for mini-slot aggregation, which may be examples of the corresponding devices described above with reference to FIGS. 1 and 2.

At 805, the UE 115-*b* may identify a set of aggregated mini-slots to be used for transmission of one or more RSs and at least one payload to the base station 105-*b*. In some cases, one or more mini-slots of the set of aggregated mini-slots may span different time intervals or frequency bandwidths. The set of aggregated mini-slots may be configured to have varying degrees of puncturing, MCS, rank, or transmit diversity, among other factors.

At 810, the UE 115-*b* may identify a data payload for transmission to the base station 105-*b*. The payload may include packets for transmission to base station 105-*b* using resources allocated for data (e.g., via physical uplink shared channel (PUSCH) resources).

At 815, the UE 115-*b* may determine an RS configuration for transmission of the one or more RSs via the set of aggregated mini-slots. In some cases, the RSs may include a DMRS, a PTRS, a CSI-RS, a time tracking RS, a frequency tracking RS, an SRS, or any other uplink RSs. In some cases, identifying a RS configuration may further comprise determining a RS pattern or density across the aggregated mini-slots. In some cases, the RS configuration may be shared across the aggregated mini-slots. For example, the RS pattern or waveform may be shared between multiple mini-slots of the set of aggregated mini-slots. In some other cases, each of the one or more mini-slots constituting the aggregated mini-slots may include its own RS configuration. In some cases, the RS configuration may be determined based at least in part on a spectral efficiency, a number of REs, a fractional TBS, a rank, a waveform, a resource allocation, a transmit diversity scheme, or any combination thereof.

At 820, the UE 115-*b* may allocate the at least one data payload to the set of aggregated mini-slots. For example, the UE 115-*b* may allocate the at least one data payload across the set of aggregated mini-slots. In some other cases, the UE 115-*b* may allocate each data payload of the at least one data payload to respective mini-slots of the set of aggregated mini-slots. In some aspects, at 820, the UE 115 may encode the set of aggregated mini-slots based at least in part on a frequency first mapping scheme or a time first mapping scheme.

At 825, the UE 115-*b* may transmit, via the set of the aggregated mini-slots, the at least one data payload and one or more RSs to the base station 105-*b*. In some cases, the transmission of the one or more RSs and the at least one data payload is based at least in part on the allocation and encoding performed at 820. In some cases, scheduling each of the aggregated mini-slots for transmission of the data payload and RSs may be based at least in part on one or more scheduling grant messages. In some cases, the scheduling grant may be indicated in DCI received from the base station 105-*b*.

Figure 9:
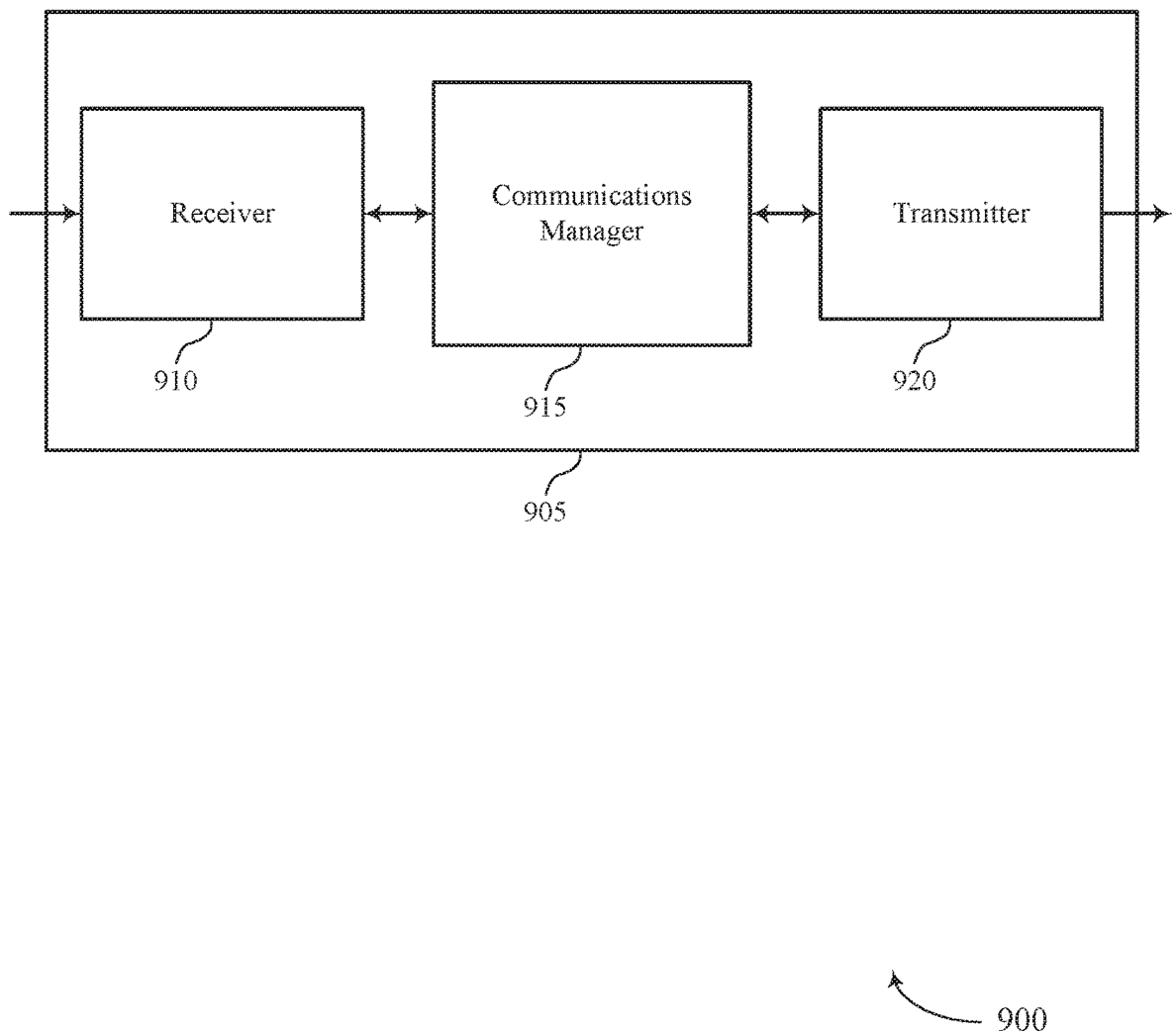
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a UE 115 as described herein. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to RS design for slot aggregation, etc.). Information may be passed on to other components of the device. The receiver 910 may be an example of aspects of the transceiver 1235 described with reference to FIG. 12. The receiver 910 may utilize a single antenna or a set of antennas.

Communications manager 915 may be an example of aspects of the communications manager 1215 described with reference to FIG. 12. Communications manager 915 or at least some of its various sub-components may be implemented in hardware, software executed by a processor, firmware, or any combination thereof. If implemented in software executed by a processor, the functions of the communications manager 915 or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915 or at least some of its various sub-components may be physically located at various positions, including being distributed such that portions of functions are implemented at different physical locations by one or more physical devices. In some examples, communications manager 915 or at least some of its various sub-components may be a separate and distinct component in accordance with various aspects of the present disclosure. In other examples, communications manager 915 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may identify a set of aggregated mini-slots to be used for transmission of one or more RSs and at least one data payload. Communications manager 915 may determine a RS configuration for transmission of the one or more RSs via the set of aggregated mini-slots and allocate the at least one data payload to resources associated with the set of aggregated mini-slots. In some examples, communications manager 915 may transmit, via the set of aggregated mini-slots, the one or more RSs and the at least one data payload based on the RS configuration and the allocation of the at least one data payload.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
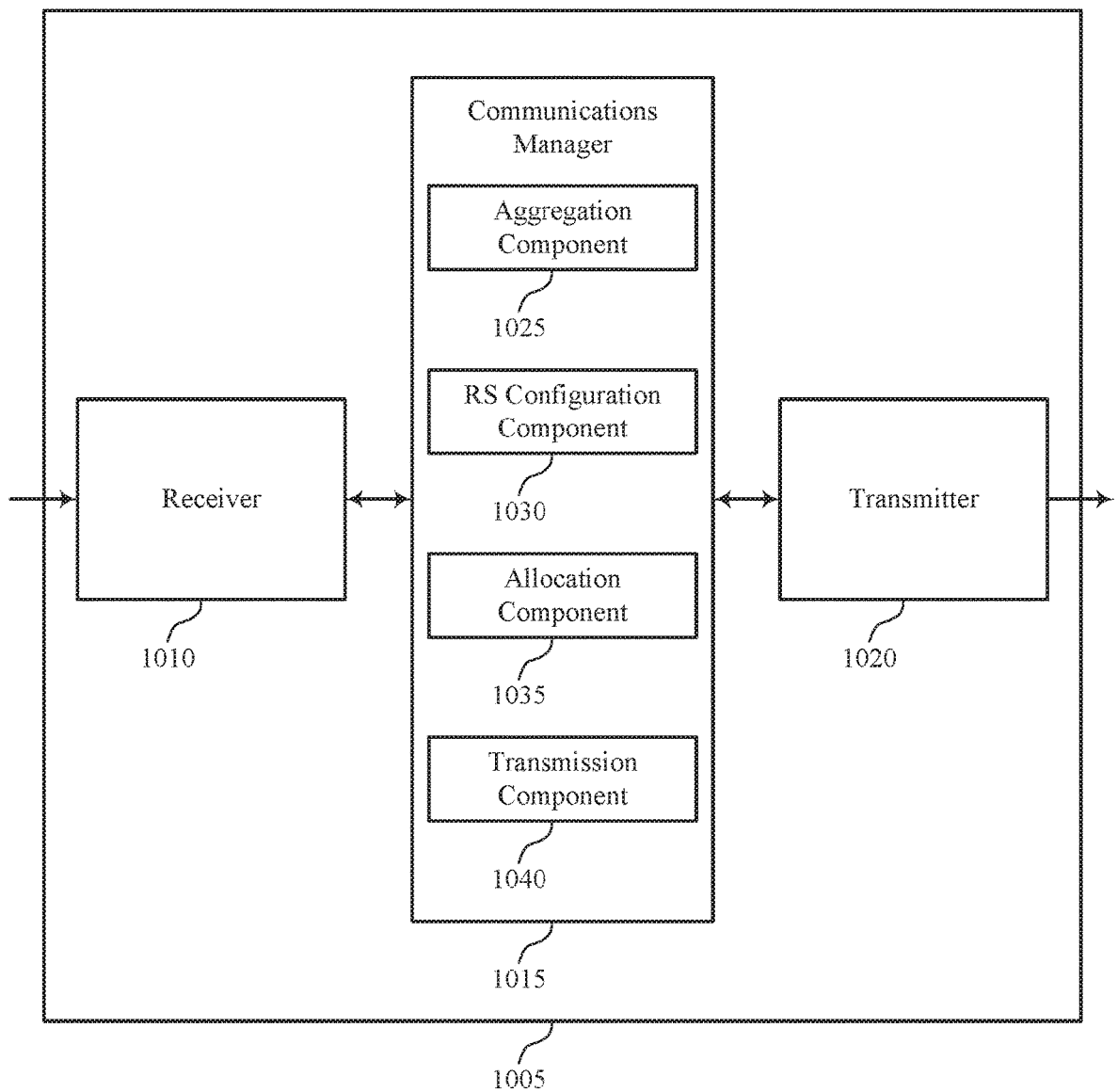

FIG. 10 shows a block diagram 1000 of a wireless device 1005 in accordance with aspects of the present disclosure. Wireless device 1005 may be an example of aspects of a wireless device 905 or a UE 115 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to RS design for slot aggregation, etc.). Information may be passed on to other components of the device. The receiver 1010 may be an example of aspects of the transceiver 1235 described with reference to FIG. 12. The receiver 1010 may utilize a single antenna or a set of antennas.

Communications manager 1015 may be an example of aspects of the communications manager 1215 described with reference to FIG. 12. Communications manager 1015 may also include aggregation component 1025, RS configuration component 1030, allocation component 1035, and transmission component 1040.

Aggregation component 1025 may identify a set of aggregated mini-slots to be used for transmission of one or more RSs and at least one data payload. In some cases, a set of mini-slots of the set of aggregated mini-slots are contiguous and have the same resource allocation. In some cases, a first mini-slot of the set of aggregated mini-slots has a bandwidth different from a second mini-slot of the set of aggregated mini-slots.

RS configuration component 1030 may determine a RS configuration for transmission of the one or more RSs via the set of aggregated mini-slots and determine whether to share the RS pattern between two mini-slots of the set of aggregated mini-slots based on one or both of a time separation and a frequency separation between the two mini-slots.

In some cases, determining the RS configuration includes: determining a RS pattern either across the set of aggregated mini-slots, or, for each mini-slot of the set of aggregated mini-slots. In some cases, the determination of the RS pattern for each mini-slot is based on at least one of an MCS, a rank, a waveform, a resource allocation, a transmit diversity scheme, or a combination thereof, of each mini-slot of the set of aggregated mini-slots. In some cases, the MCS, the rank, the waveform, the resource allocation, or the transmit diversity scheme for a first mini-slot of the set of aggregated mini-slots is different for a second mini-slot of the set of aggregated mini-slots.

In some examples, the RS configuration for a first mini-slot of the set of aggregated mini-slots is different from the RS configuration for a second mini-slot of the set of aggregated mini-slots. The RS configuration for a first mini-slot of the set of aggregated mini-slots may be based on a degree of puncturing for the first mini-slot and the degree of puncturing for the first mini-slot may be based on an additional signal configured for the at least one mini-slot.

In some cases, determining the RS configuration includes: determining a RS pattern across the set of aggregated mini-slots, where the RS pattern is shared between multiple mini-slots of the set of aggregated mini-slots. In some cases, a RS waveform for a first mini-slot of the set of aggregated mini-slots is different than the RS waveform for a second mini-slot of the set of aggregated mini-slots.

According to some aspects, the RS configuration for the multiple mini-slots is determined based on the DCI corresponding to the multiple mini-slots. In some cases, the RS configuration is determined based on a spectral efficiency, a number of REs, a TBS, a ratio of TBS and number of REs, or any combination thereof, of one or more mini-slots of the set of aggregated mini-slots. In some cases, the RS configuration is determined based on a fractional TBS, a rank, a waveform, a transmit diversity scheme, or any combination thereof.

Allocation component 1035 may allocate the at least one data payload to resources associated with the set of aggregated mini-slots. Allocation of the at least one data payload may be based on a single grant message. In some cases, allocating the at least one data payload includes: allocating the at least one data payload across the set of aggregated mini-slots or to respective mini-slots of the set of aggregated mini-slots. In some cases, the allocation of the at least one data payload is based on an MCS for each mini-slot of the set of aggregated mini-slots. According to some examples, the MCS for a first mini-slot may be different than the MCS for a second mini-slot.

Transmission component 1040 may transmit, via the set of aggregated mini-slots, the one or more RSs based on the RS configuration. In some cases, the transmission component 1040 may transmit, via the set of aggregated mini-slots, at least one data payload based on the allocation of the at least one data payload.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
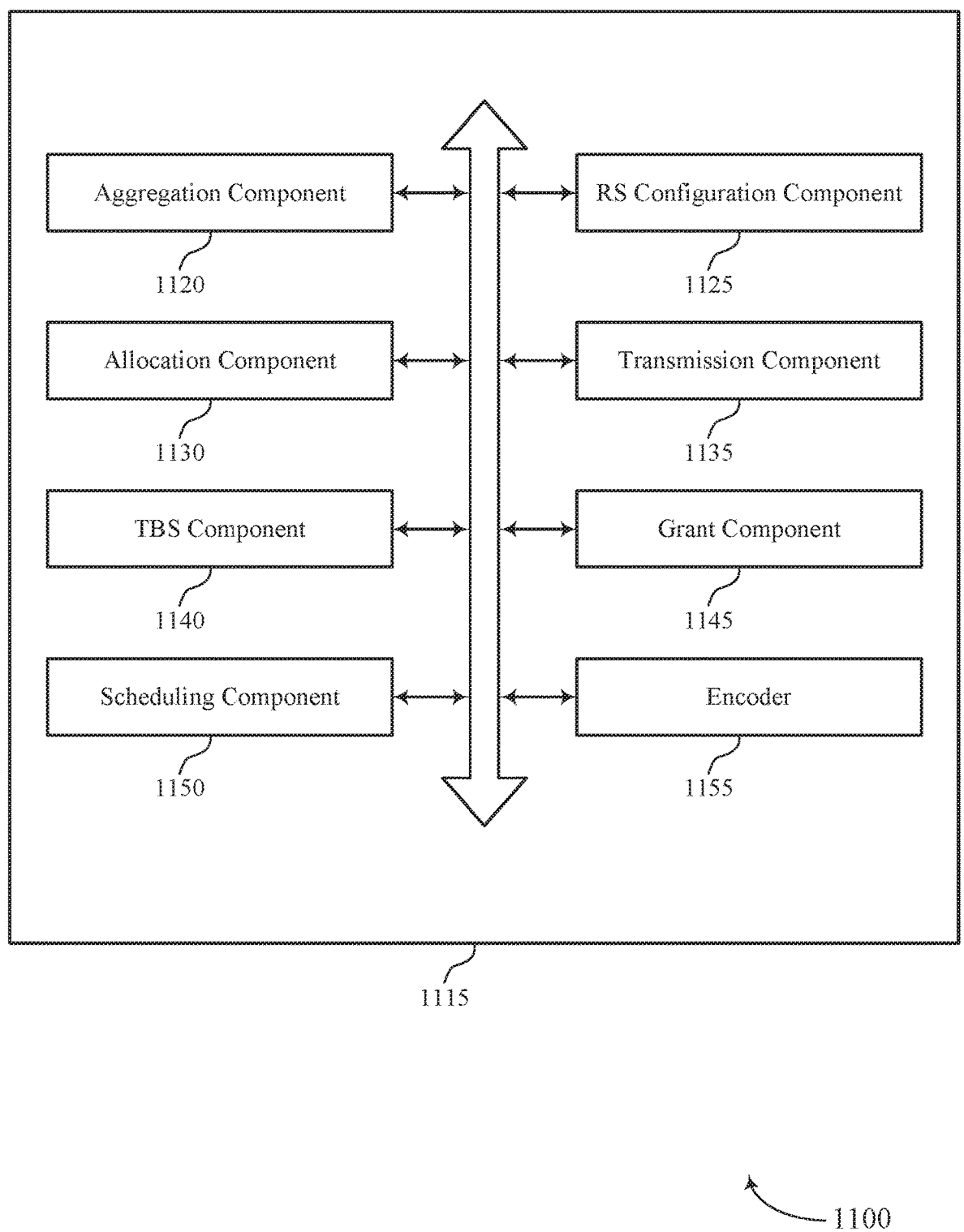

FIG. 11 shows a block diagram 1100 of a communications manager 1115 in accordance with aspects of the present disclosure. The communications manager 1115 may be an example of aspects of a communications manager 915, a communications manager 1015, or a communications manager 1215 described with reference to FIGS. 9, 10, and 12. The communications manager 1115 may include aggregation component 1120, RS configuration component 1125, allocation component 1130, transmission component 1135, TBS component 1140, grant component 1145, scheduling component 1150, and encoder 1155. Each of these modules may communicate, directly or indirectly, with one another (e.g., via one or more buses).

Aggregation component 1120 may identify a set of aggregated mini-slots to be used for transmission of one or more RSs and at least one data payload. In some cases, a set of mini-slots of the set of aggregated mini-slots are contiguous and have the same resource allocation. In some examples, a first mini-slot of the set of aggregated mini-slots has a bandwidth different from a second mini-slot of the set of aggregated mini-slots.

RS configuration component 1125 may determine a RS configuration for transmission of the one or more RSs via the set of aggregated mini-slots and determine whether to share the RS pattern between two mini-slots of the set of aggregated mini-slots based on one or both of a time separation and a frequency separation between the two mini-slots.

In some cases, determining the RS configuration includes: determining a RS pattern across the set of aggregated mini-slots or for each mini-slot of the set of aggregated mini-slots. In some cases, the determination of the RS pattern for each mini-slot is based on at least one of an MCS, a rank, a waveform, a resource allocation, a transmit diversity scheme, or a combination thereof of each mini-slot of the set of aggregated mini-slots. In some cases, the MCS, the rank, the waveform, the resource allocation, or the transmit diversity scheme for a first mini-slot of the set of aggregated mini-slots is different for a second mini-slot of the set of aggregated mini-slots.

In some examples, the RS configuration for a first mini-slot of the set of aggregated mini-slots is different from the RS configuration for a second mini-slot of the set of aggregated mini-slots. The RS configuration for a first mini-slot of the set of aggregated mini-slots may be based on a degree of puncturing for the first mini-slot and the degree of puncturing for the first mini-slot may be based on an additional signal configured for the at least one mini-slot.

In some cases, determining the RS configuration includes: determining a RS pattern across the set of aggregated mini-slots, where the RS pattern is shared between multiple mini-slots of the set of aggregated mini-slots. In some cases, a RS waveform for a first mini-slot of the set of aggregated mini-slots is different than the RS waveform for a second mini-slot of the set of aggregated mini-slots.

According to some aspects, the RS configuration for the multiple mini-slots is determined based on the DCI corresponding to the multiple mini-slots. In some cases, the RS configuration is determined based on a spectral efficiency, a number of REs, a TBS, a ratio of TBS and number of REs, or any combination thereof of one or more mini-slots of the set of aggregated mini-slots. In some cases, the RS configuration is determined based on a fractional TBS, a rank, a waveform, a transmit diversity scheme, or any combination thereof. In some cases, the one or more RSs may include a DMRS, a PTRS, a time tracking RS, or a frequency tracking RS.

Allocation component 1130 may allocate the at least one data payload to resources associated with the set of aggregated mini-slots. Allocation of the at least one data payload may be based on a single grant message. In some cases, allocating the at least one data payload includes: allocating the at least one data payload across the set of aggregated mini-slots or to respective mini-slots of the set of aggregated mini-slots. In some cases, the allocation of the at least one data payload is based on an MCS for each mini-slot of the set of aggregated mini-slots. According to some examples, the MCS for a first mini-slot may be different than the MCS for a second mini-slot.

Transmission component 1135 may transmit, via the set of aggregated mini-slots, the one or more RSs based on the RS configuration. In some cases, the transmission component 1135 may transmit, via the set of aggregated mini-slots, at least one data payload based on the allocation of the at least one data payload.

TBS component 1140 may determine the TBS for a first mini-slot of the set of aggregated mini-slots based on a number of REs associated with the set of aggregated mini-slots, a modulation order of each mini-slot of the set of aggregated mini-slots, a rank of each mini-slot of the set of aggregated mini-slots, a degree of puncturing of each mini-slot of the set of aggregated mini-slots, a rate-matching scheme for each mini-slot of the set of aggregated mini-slots, or any combination thereof, where a portion of the at least one data payload is allocated to the first mini-slot based on the fractional TBS.

Grant component 1145 may identify at least one grant that includes information common to multiple mini-slots of the set of aggregated mini-slots, where DCI corresponding to the multiple mini-slots is based on the information common to the multiple mini-slots, and identify the at least one grant is based on identification of an indicator that points to the at least one grant. In some cases, the indicator that points to the at least one grant is included in the DCI corresponding to the multiple mini-slots. In some cases, the information common to the multiple mini-slots includes a waveform characteristic, a resource block allocation, a rank, or a combination thereof. In some examples, the DCI includes one or more shortened fields corresponding to the information common to the multiple mini-slots. In some aspects, the at least one grant consists of a single grant.

Scheduling component 1150 may determine one or more scheduling parameters for each mini-slot of the set of aggregated mini-slots and a separation between at least two mini-slots of the set of aggregated mini-slots, where the RS configuration is determined based on the scheduling parameter and the separation. Scheduling component 1150 may determine, based on a single grant message, one or more scheduling parameters common to multiple mini-slots of the set of aggregated mini-slots, where the RS pattern is based on the one or more scheduling parameters, and schedule each of the set of aggregated mini-slots via respective grant messages or via a single grant message.

Encoder 1155 may encode the set of aggregated mini-slots based on a frequency-first mapping scheme or a time-first mapping scheme, where transmission of the one or more RSs and the at least one data payload is based on the encoding.

Figure 12:
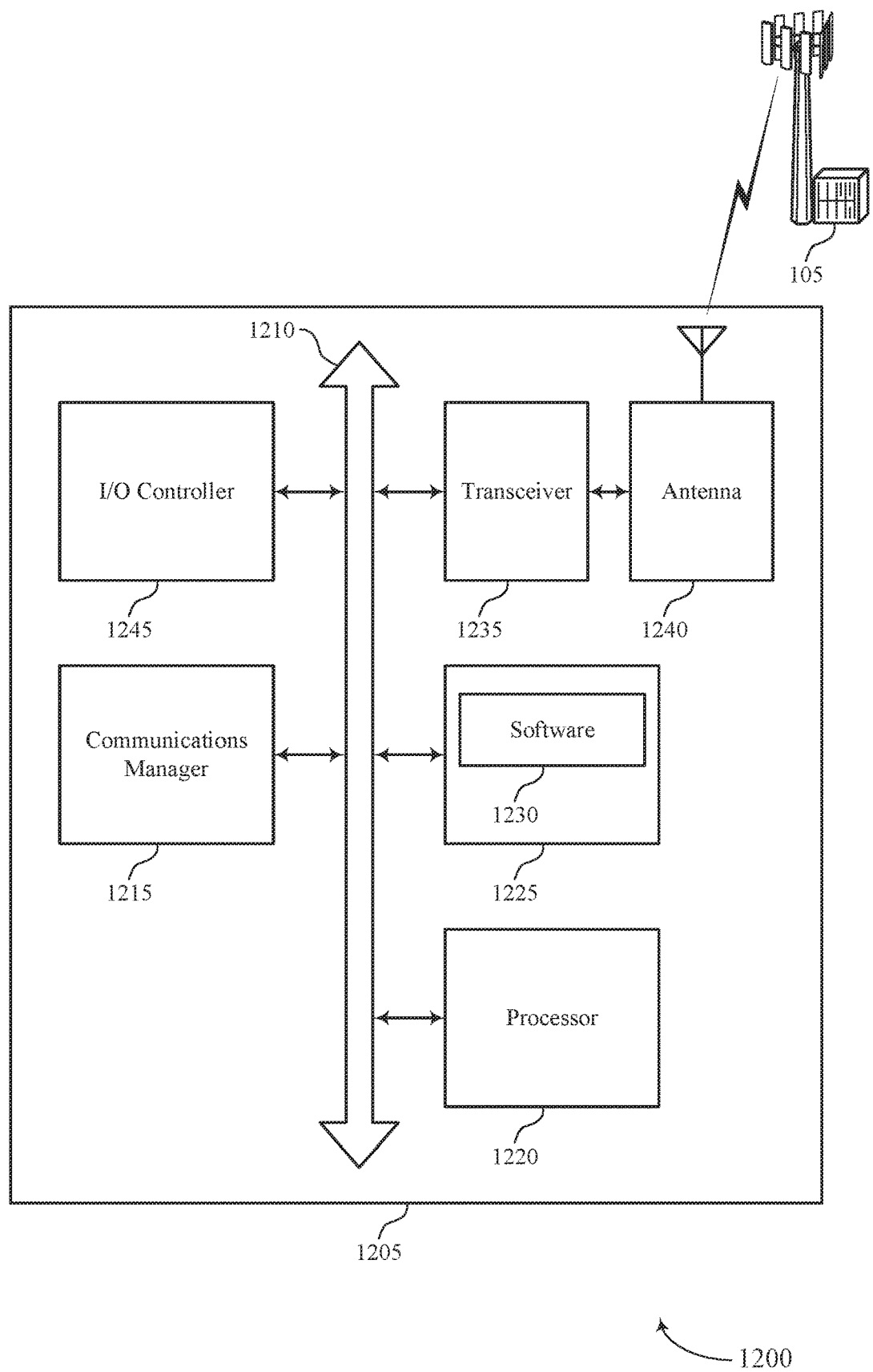
FIG. 12 illustrates a block diagram of a system including a user equipment (UE) in accordance with aspects of the present disclosure.

FIG. 12 shows a diagram of a system 1200 including a device 1205 in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting RS design for slot aggregation).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support RS design for slot aggregation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
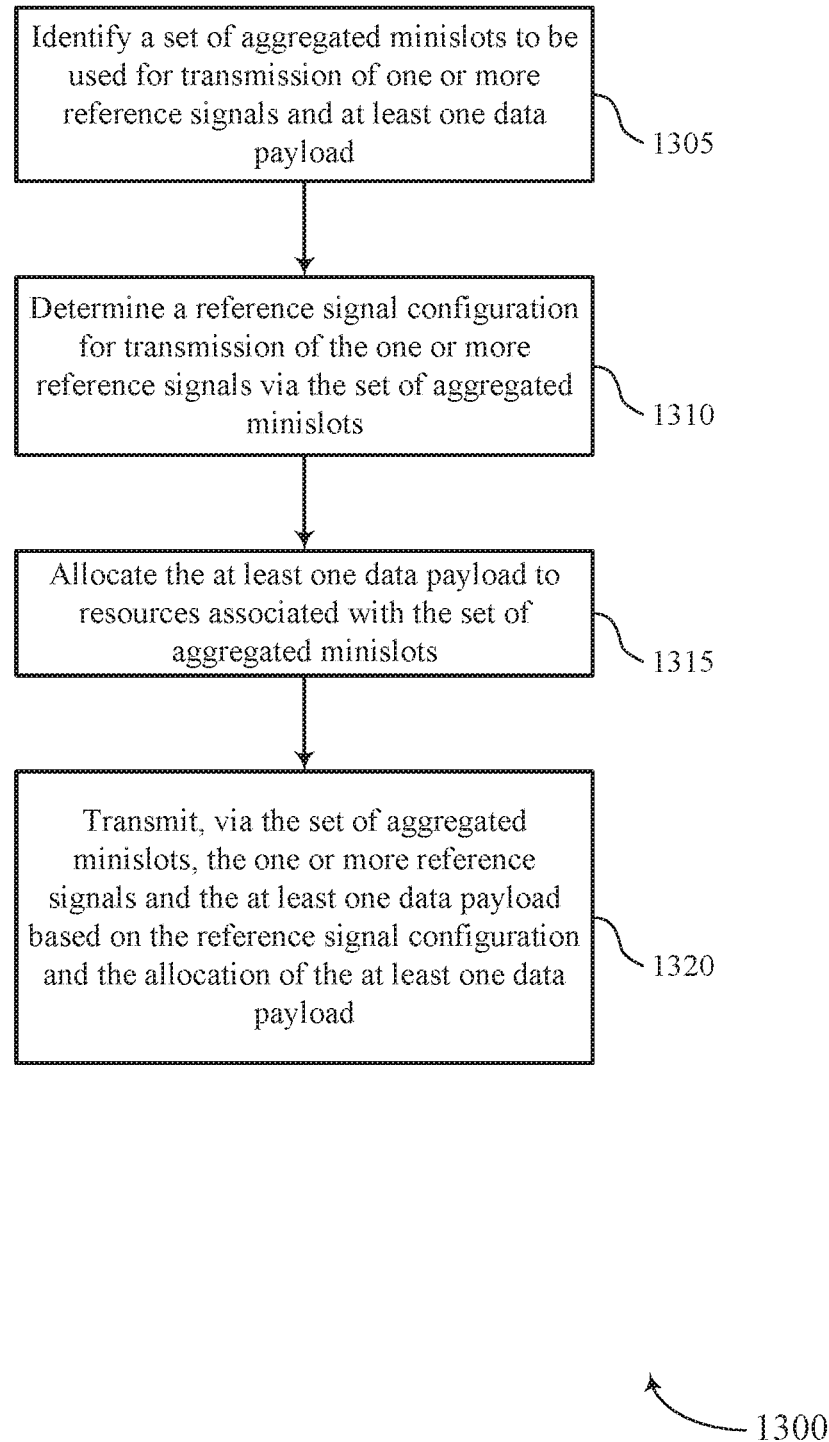
FIGS. 13 through 15 illustrate methods for reference signal design in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may identify a set of aggregated mini-slots to be used for transmission of one or more RSs and at least one data payload. In some cases, at least one mini-slot of the set of aggregated mini-slots may be a subset of a slot. The operations at 1305 may be performed according to the methods described herein. In certain examples, aspects of the operations at 1305 may be performed by an aggregation component as described with reference to FIGS. 9 through 12.

At 1310, the UE 115 may determine a RS configuration for transmission of the one or more RSs via the set of aggregated mini-slots. The operations at 1310 may be performed according to the methods described herein. In certain examples, aspects of the operations at 1310 may be performed by a RS configuration component as described with reference to FIGS. 9 through 12.

At 1315, the UE 115 may allocate the at least one data payload to resources associated with the set of aggregated mini-slots. The operations at 1315 may be performed according to the methods described herein. In certain examples, aspects of the operations at 1315 may be performed by an allocation component as described with reference to FIGS. 9 through 12. In some examples, a payload (e.g., a data packet, a voice packet) may be allocated to an individual mini-slot or across multiple mini-slots. For instance, a first payload may be allocated to resources available within a first mini-slot and a second payload may be allocated to multiple mini-slots. The payloads may be allocated resources based on corresponding TBSs, available resources, the MCS of one or more mini-slots, among other factors.

At 1320, the UE 115 may transmit, via the set of aggregated mini-slots, the one or more RSs and the at least one data payload based at least in part on the RS configuration and the allocation of the at least one data payload. The operations at 1320 may be performed according to the methods described herein. In certain examples, aspects of the operations at 1320 may be performed by a transmission component as described with reference to FIGS. 9 through 12. For example, the one or more RSs may be transmitted based on an RS configuration such that a shared RS is transmitted over multiple mini-slots or one or more RSs are transmitted according to respective RS patterns for each of multiple mini-slots. In some examples, the at least one data payload may be transmitted according to the allocation of 1315 such that a payload is allocated resources to multiple mini-slots or multiple payloads are allocated resources in respective mini-slots.

Figure 14:
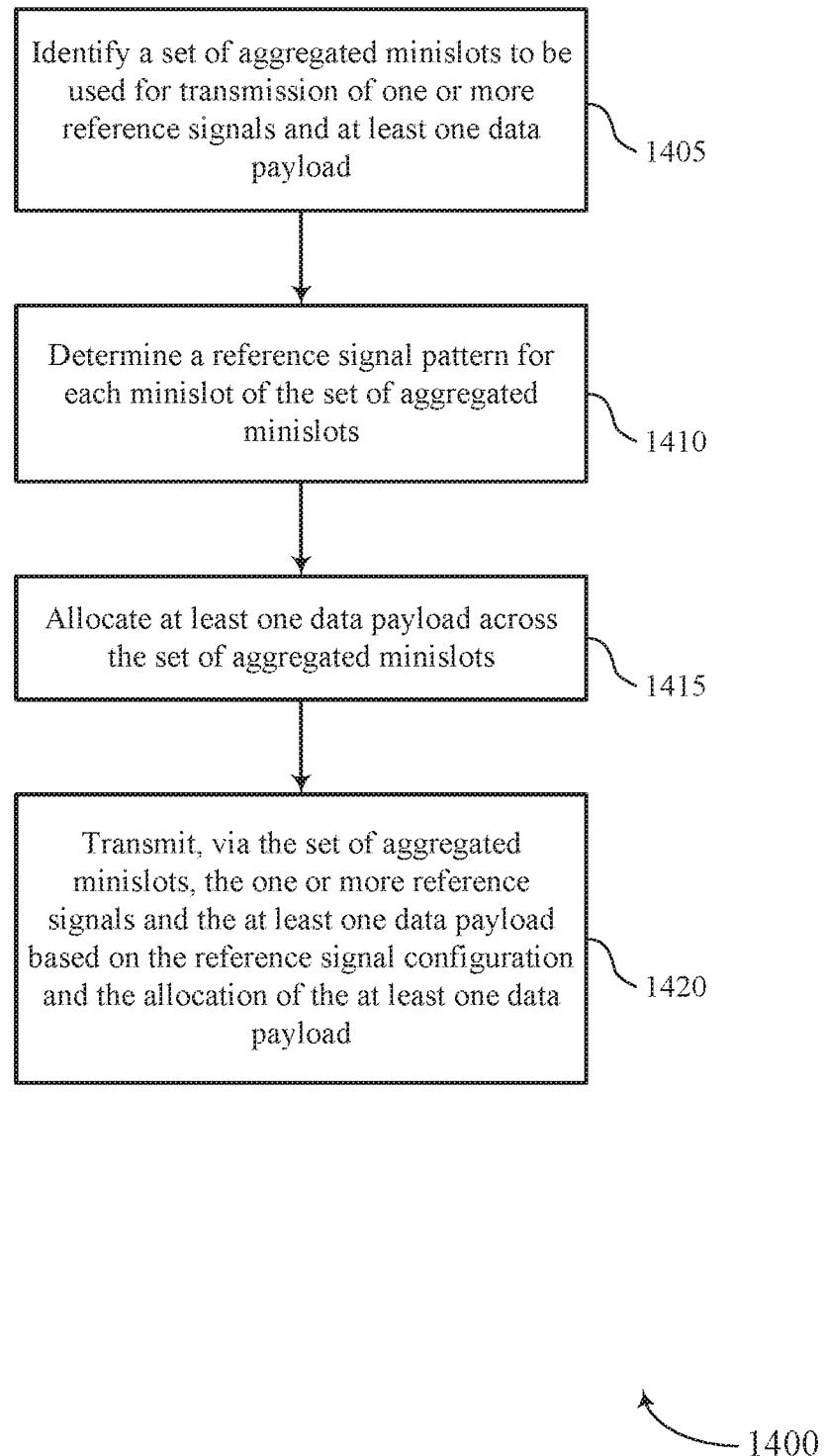

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may identify a set of aggregated mini-slots to be used for transmission of one or more RSs and at least one data payload. In some cases, at least one mini-slot of the set of aggregated mini-slots may be a subset of a slot. The operations at 1405 may be performed according to the methods described herein. In certain examples, aspects of the operations at 1405 may be performed by an aggregation component as described with reference to FIGS. 9 through 12.

At 1410, the UE 115 may determine a reference signal pattern for each mini-slot of the set of aggregated mini-slots. The operations at 1410 may be performed according to the methods described herein. In certain examples, aspects of the operations at 1410 may be performed by a RS configuration component as described with reference to FIGS. 9 through 12.

At 1415, the UE 115 may allocate at least one data payload across the set of aggregated mini-slots. The operations at 1415 may be performed according to the methods described herein. In certain examples, aspects of the operations at 1415 may be performed by an allocation component as described with reference to FIGS. 9 through 12.

At 1420, the UE 115 may transmit, via the set of aggregated mini-slots, the one or more RSs and the at least one data payload based at least in part on the RS configuration and the allocation of the at least one data payload. The operations at 1420 may be performed according to the methods described herein. In certain examples, aspects of the operations at 1420 may be performed by a transmission component as described with reference to FIGS. 9 through 12.

Figure 15:
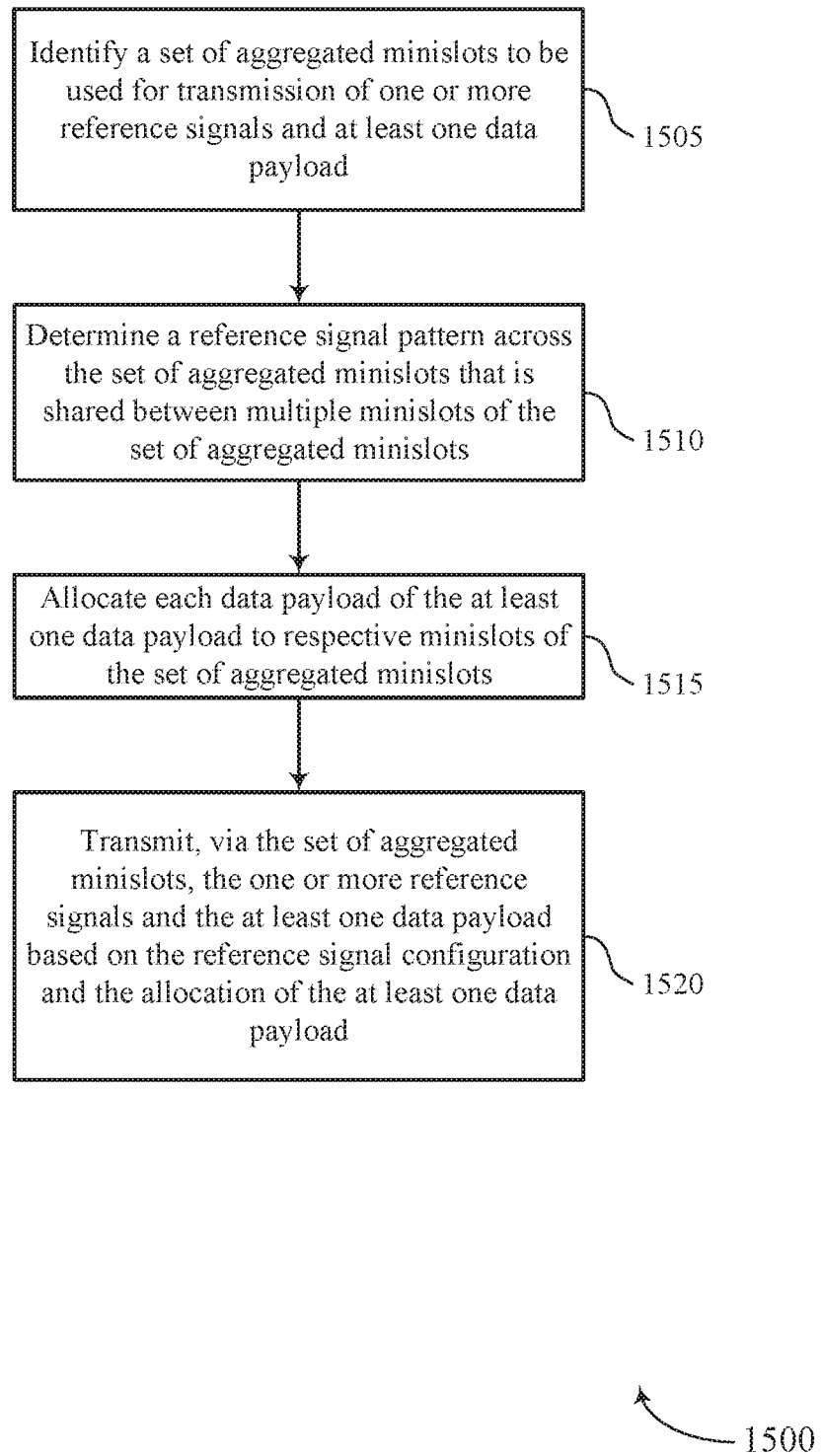

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may identify a set of aggregated mini-slots to be used for transmission of one or more RSs and at least one data payload. In some cases, at least one mini-slot of the set of aggregated mini-slots may be a subset of a slot. The operations at 1505 may be performed according to the methods described herein. In certain examples, aspects of the operations at 1505 may be performed by an aggregation component as described with reference to FIGS. 9 through 12.

At 1510, the UE 115 may determine a reference signal pattern across the set of aggregated mini-slots that is shared between multiple mini-slots of the set of aggregated mini-slots. The operations at 1510 may be performed according to the methods described herein. In certain examples, aspects of the operations at 1510 may be performed by a RS configuration component as described with reference to FIGS. 9 through 12.

At 1515, the UE 115 may allocate each data payload of the at least one data payload to respective mini-slots of the set of aggregated mini-slots. The operations at 1515 may be performed according to the methods described herein. In certain examples, aspects of the operations at 1515 may be performed by an allocation component as described with reference to FIGS. 9 through 12.

At 1520, the UE 115 may transmit, via the set of aggregated mini-slots, the one or more RSs and the at least one data payload based at least in part on the RS configuration and the allocation of the at least one data payload. In some cases, determining the RS configuration may comprise determining a RS pattern across the set of aggregated mini-slots. In some cases, allocating the at least one data payload may comprise allocating the at least one data payload across the set of aggregated mini-slots. The operations at 1520 may be performed according to the methods described herein. In certain examples, aspects of the operations at 1520 may be performed by a transmission component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Further, as used herein, a processor refers to its structural meaning.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

identifying a set of mini-slots to be used for transmission of one or more reference signals and at least one data payload, the set of mini-slots having a first reference signal configuration for transmission of the one or more reference signals;

aggregating the set of mini-slots to form an aggregated mini-slot for transmission of the one or more reference signals;

determining a second reference signal configuration for transmission of the one or more reference signals within the aggregated mini-slot, the second reference signal configuration being different from the first reference signal configuration based at least in part on at least one of the one or more reference signals being removed or repositioned relative to the first reference signal configuration for transmission of the one or more reference signals;

allocating the at least one data payload to resources associated with the aggregated mini-slot; and transmitting, within the aggregated mini-slot, the one or more reference signals and the at least one data payload based at least in part on the second reference signal configuration and the allocation of the at least one data payload.

2. The method of claim 1, wherein allocating the at least one data payload comprises:

allocating the at least one data payload across the set of mini-slots of the aggregated mini-slot.

3. The method of claim 1, wherein allocating the at least one data payload comprises:

allocating each data payload of the at least one data payload to respective mini-slots of the aggregated mini-slot.

4. The method of claim 1, wherein determining the second reference signal configuration comprises:

determining a reference signal pattern across the set of mini-slots of the aggregated mini-slot.

5. The method of claim 1, wherein allocating the at least one data payload comprises:

allocating the at least one data payload across the set of mini-slots of the aggregated mini-slot; and determining the second reference signal configuration comprises determining a reference signal pattern for each mini-slot of the aggregated mini-slot.

6. The method of claim 1, further comprising:

determining a degree of puncturing for at least one mini-slot of the aggregated mini-slot, wherein divisions of the at least one mini-slot are based at least in part on the determined degree of puncturing.

7. The method of claim 1, wherein allocating the at least one data payload comprises:

allocating each data payload of the at least one data payload to respective mini-slots of the aggregated mini-slot; and determining the second reference signal configuration comprises determining a reference signal pattern across the set of mini slots of the aggregated mini-slot, wherein the reference signal pattern is shared between multiple mini-slots of the aggregated mini-slot.

8. The method of claim 7, wherein a reference signal waveform for a first mini-slot of the aggregated mini-slot is different than the reference signal waveform for a second mini-slot of the aggregated mini-slot.

9. The method of claim 7, further comprising:

identifying at least one grant that comprises information common to multiple mini-slots of the aggregated mini-slot, wherein downlink control information (DCI) corresponding to the multiple mini-slots is based at least in part on the information common to the multiple mini-slots.

10. The method of claim 9, further comprising:

identifying the at least one grant is based at least in part on identification of an indicator that points to the at least one grant.

11. The method of claim 10, wherein the indicator that points to the at least one grant is included in the DCI corresponding to the multiple mini-slots.

12. The method of claim 9, wherein the information common to the multiple mini-slots comprises a waveform characteristic, a resource block allocation, a rank, or a combination thereof.

13. The method of claim 9, wherein the DCI comprises one or more shortened fields corresponding to the information common to the multiple mini-slots.

14. The method of claim 9, wherein the at least one grant consists of a single grant.

15. The method of claim 9, wherein the second reference signal configuration for the multiple mini-slots is determined based at least in part on the DCI corresponding to the multiple mini-slots.

16. The method of claim 7, further comprising:

determining one or more scheduling parameters for each mini-slot of the aggregated mini-slot and a separation between at least two mini-slots of the aggregated mini-slot, wherein the second reference signal configuration is determined based at least in part on the one or more scheduling parameters and the separation.

17. The method of claim 7, further comprising:

determining whether to share the reference signal pattern between two mini-slots of the aggregated mini-slot based at least in part on one or both of a time separation and a frequency separation between the two mini-slots.

18. The method of claim 7, wherein a plurality of mini-slots of the aggregated mini-slot are contiguous and have the same resource allocation.

19. The method of claim 1, wherein allocating the at least one data payload comprises:

allocating the at least one data payload across the aggregated mini-slot and based at least in part on a single grant message; and determining the reference signal configuration comprises determining a reference signal pattern across the aggregated mini-slot, wherein the reference signal pattern is shared between multiple mini-slots of the aggregated mini-slot.

20. The method of claim 19, further comprising:

determining, based at least in part on the single grant message, one or more scheduling parameters common to multiple mini-slots of the aggregated mini-slot wherein the reference signal pattern is based at least in part on the one or more scheduling parameters.

21. The method of claim 19, wherein the allocation of the at least one data payload or the determination of the reference signal configuration is based at least in part on a modulation and coding scheme (MCS) for each mini-slot of the aggregated mini-slot, and wherein the MCS for a first mini-slot is different than the MCS for a second mini-slot.

22. The method of claim 1, further comprising:

encoding the aggregated mini-slot based at least in part on a frequency-first mapping scheme or a time-first mapping scheme, wherein transmission of the one or more reference signals and the at least one data payload is based at least in part on the encoding.

23. The method of claim 1, further comprising:

scheduling each mini-slot of the aggregated mini-slot via respective grant messages or via a single grant message.

24. The method of claim 1, wherein a first mini-slot of the aggregated mini-slot has a bandwidth different from a second mini-slot of the aggregated mini-slot.

25. The method of claim 1, wherein the reference signal configuration is determined based at least in part on a spectral efficiency, a number of resource elements (REs), a transport block size (TBS), a ratio of TBS and number of REs, or any combination thereof of one or more mini-slots of the aggregated mini-slot.

26. The method of claim 1, wherein the reference signal configuration is determined based at least in part on a modulation and coding scheme (MCS) for each mini-slot of the aggregated mini-slot.

27. The method of claim 1, wherein the allocation of the at least one data payload is based at least in part on a modulation and coding scheme (MCS) for each mini-slot of the aggregated mini-slot, and wherein the MCS for a first mini-slot of the aggregated mini-slot is different than the MCS for a second mini-slot of the aggregated mini-slot.

28. An apparatus for wireless communication, comprising:
a processor,
memory in electronic communication with the processor; and
instructions stored in the memory and executable by the processor to cause the apparatus to:
identify a set of mini-slots to be used for transmission of one or more reference signals and at least one data payload, the set of mini-slots having a first reference signal configuration for transmission of the one or more reference signals;
aggregate the set of mini-slots to form an aggregated mini-slot for transmission of the one or more reference signals
determine a second reference signal configuration for transmission of the one or more reference signals within the aggregated mini-slot, the second reference signal configuration being different from the first reference signal configuration based at least in part on at least one of the one or more reference signals being removed or repositioned relative to the first reference signal configuration for transmission of the one or more reference signals;
allocate the at least one data payload to resources associated with the aggregated mini-slot; and
transmit, within the aggregated mini-slot, the one or more reference signals and the at least one data payload based at least in part on the second reference signal configuration and the allocation of the at least one data payload.

29. An apparatus for wireless communication, comprising:
means for identifying a set of mini-slots to be used for transmission of one or more reference signals and at least one data payload, the set of mini-slots having a first reference signal configuration for transmission of the one or more reference signals;
means for aggregating the set of mini-slots to form an aggregated mini-slot for transmission of the one or more reference signals;
means for determining a second reference signal configuration for transmission of the one or more reference signals within the aggregated mini-slot, the second reference signal configuration being different from the first reference signal configuration based at least in part on at least one of the one or more reference signals being removed or repositioned relative to the first reference signal configuration for transmission of the one or more reference signals;
means for allocating the at least one data payload to resources associated with the aggregated mini-slot; and
means for transmitting, within the aggregated mini-slot, the one or more reference signals and the at least one data payload based at least in part on the second reference signal configuration and the allocation of the at least one data payload.

30. A non-transitory computer-readable medium storing code for wireless communication, the code comprising instructions executable by a processor to:
identify a set of mini-slots to be used for transmission of one or more reference signals and at least one data payload, the set of mini-slots having a first reference signal configuration for transmission of the one or more reference signals;
aggregate the set of mini-slots to form an aggregated mini-slot for transmission of the one or more reference signals;
determine a second reference signal configuration for transmission of the one or more reference signals within the aggregated mini-slot, the second reference signal configuration being different from the first reference signal configuration based at least in part on at least one of the one or more reference signals being removed or repositioned relative to the first reference signal configuration for transmission of the one or more reference signals;
allocate the at least one data payload to resources associated with the aggregated mini-slot; and
transmit, within the aggregated mini-slot, the one or more reference signals and the at least one data payload based at least in part on the second reference signal configuration and the allocation of the at least one data payload.

* * * * *